United States Patent [19]
Gelders

[11] 3,838,574
[45] Oct. 1, 1974

[54] HYDRAULIC TRANSMISSION SYSTEM
[76] Inventor: Albert H. Gelders, 2609 Elmhurst, Oklahoma City, Okla. 73120
[22] Filed: July 13, 1973
[21] Appl. No.: 379,072

[52] U.S. Cl.................60/494, 60/325, 60/413, 60/468, 192/61
[51] Int. Cl.......................... F15b 1/02, F15b 15/18
[58] Field of Search......... 60/1, 325, 395, 413, 419, 60/439, 468

[56] References Cited
UNITED STATES PATENTS

| | | | |
|---|---|---|---|
| 2,254,274 | 9/1941 | Doe | 60/395 X |
| 2,406,965 | 9/1946 | Orr | 60/419 X |
| 2,876,704 | 3/1959 | Collion et al. | 60/419 X |
| 2,988,889 | 6/1961 | Bookout et al. | 60/419 |
| 3,129,559 | 4/1964 | Matthews | 60/1 |
| 3,570,245 | 3/1971 | Van Der Linde | 60/413 |

Primary Examiner—Edgar W. Geoghegan
Attorney, Agent, or Firm—Dunlap, Laney, Hessin, Dougherty & Codding

[57] ABSTRACT

An improved hydraulic transmission system, having a control discharge valve bypassing measured amounts of power fluid in impulses at controlled intervals of time, wherein the transmission system output shaft rotational speed is controllingly varied, the torque being applied at the transmission system output shaft in impulses of increased torque amplitude.

14 Claims, 10 Drawing Figures

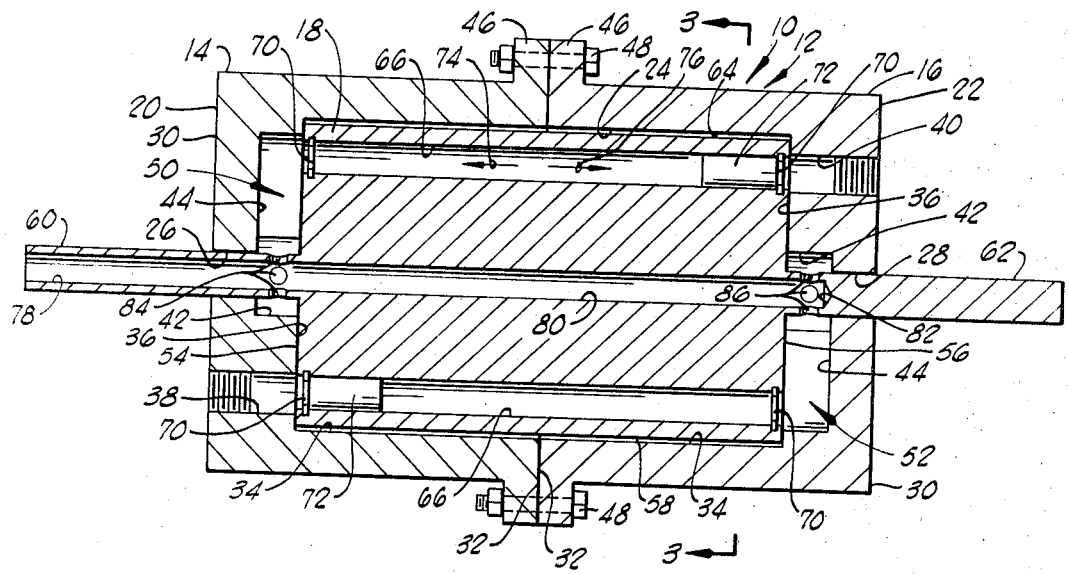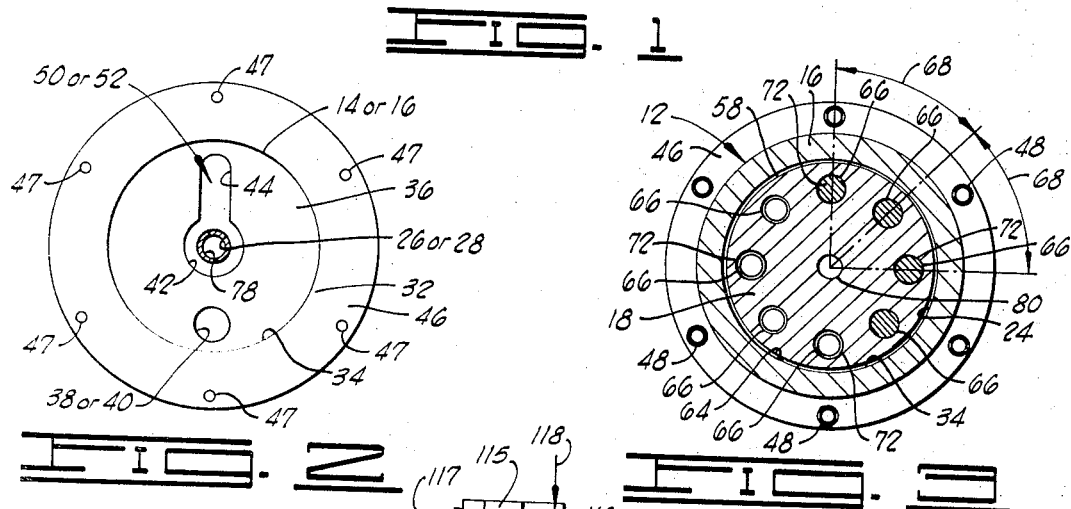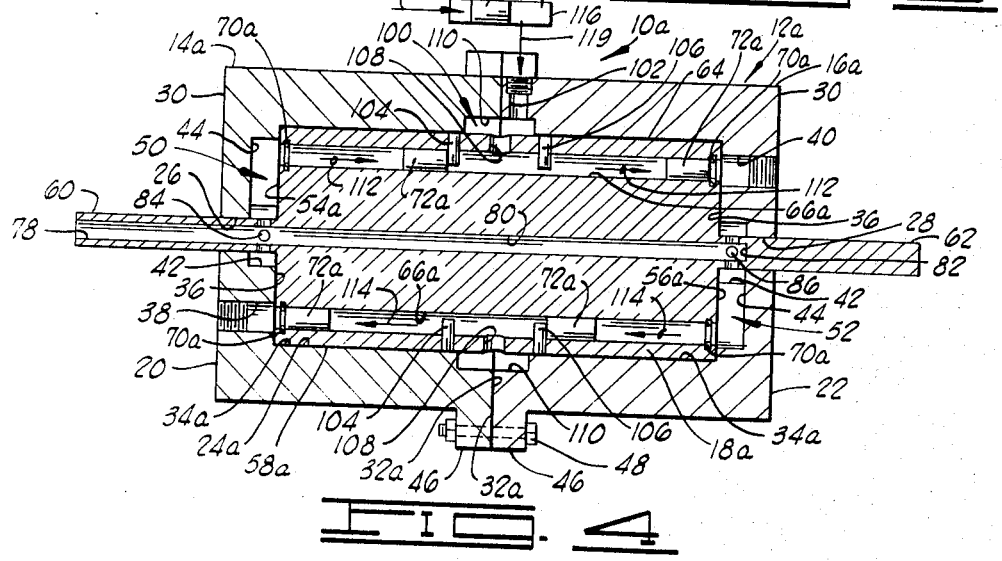

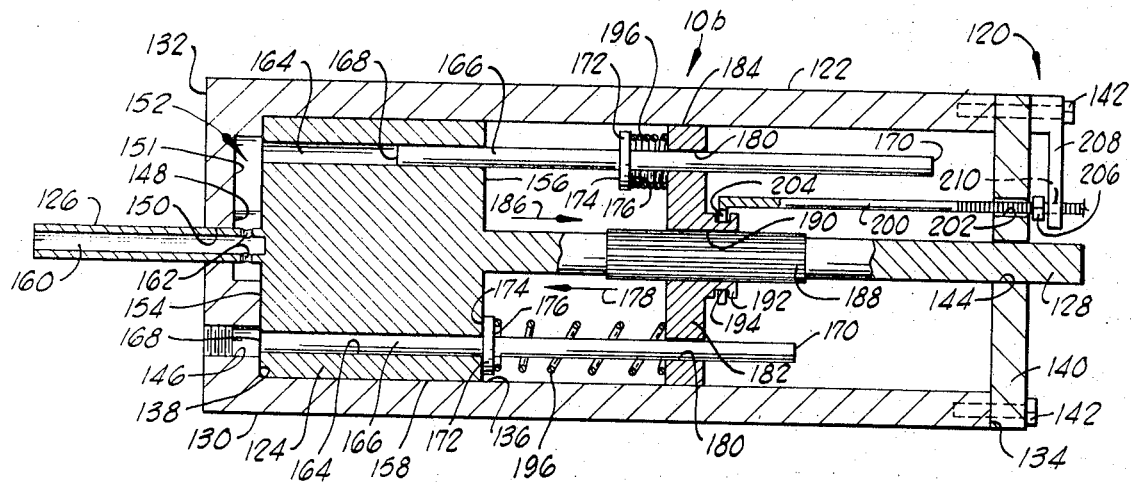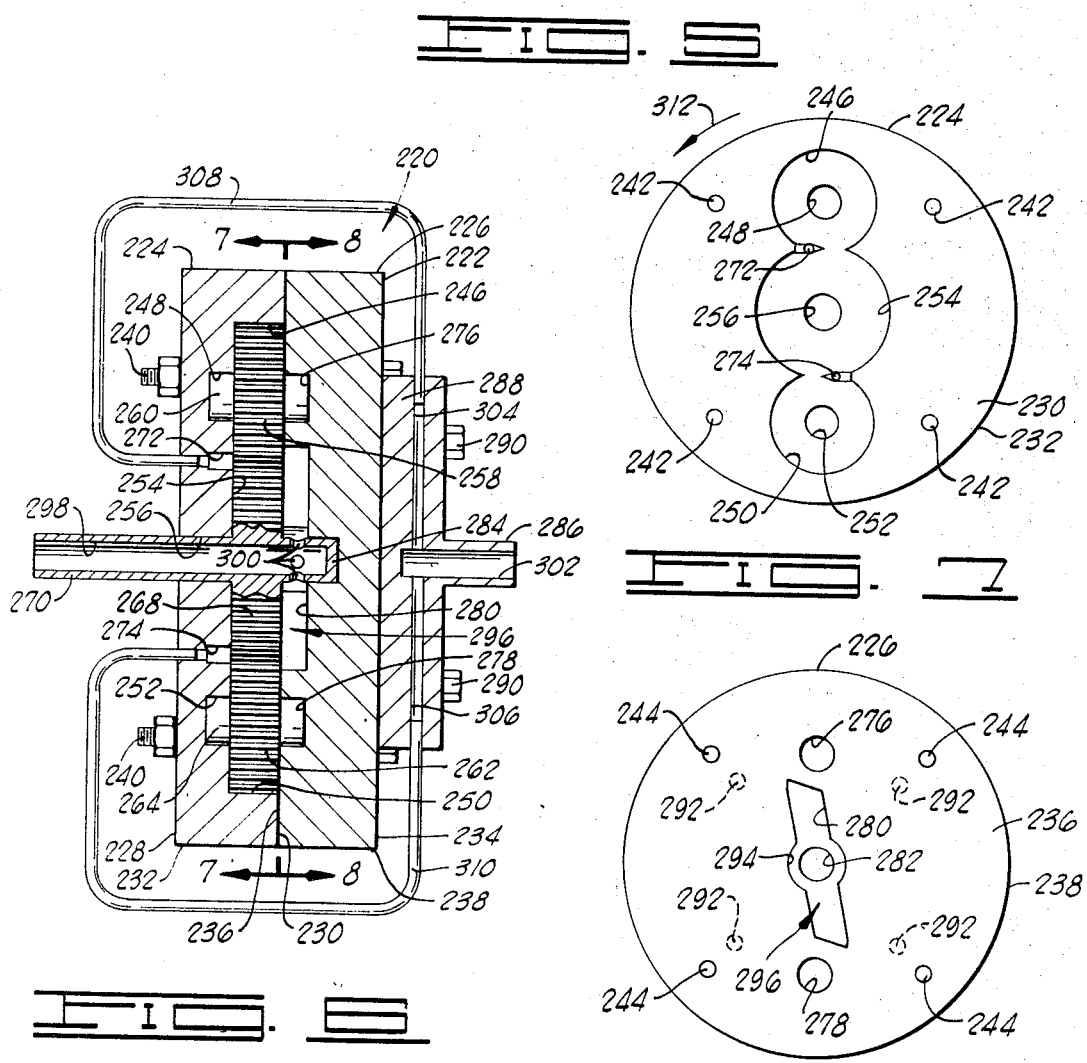

HYDRAULIC TRANSMISSION SYSTEM

BACKGROUND OF THE INVENTION

1. Field of the Invention

The present invention relates generally to hydraulic transmission systems and, more particularly, but not by way of limitation, to a hydraulic transmission system wherein impulses of increased torque are applied at the output shaft.

2. Description of the Prior Art

The U.S. Pat. No. 3,016,020, issued to Rineer, discloses a power converter for storing energy to be released in a pulse type power fluid output for driving a punch press, for example. The punch press is driven via a pair of hydraulic motors of the positive displacement type, the power fluid being supplied to the punch press from the hydraulic motors via a flow control valve, a reversing valve, and a fluid power converter. The fluid power converter includes a rotor and stationary housing (stator) and a plurality of circumferentially spaced ports for establishing preselected, sequential communication, the power converter being mounted within a flywheel for storing energy in the equilibrium state to be subsequently released. During the work cycle of the punch press, the stored energy in the flywheel (inertia) acts to resist a back pressure tending to reduce the flow of fluid through the power converter, the stored energy in the flywheel being released to drive the power converter in the opposite direction. The operation of the combined flywheel and the power converter is such that the combination strives, due to the inertia of the flywheel, to rotate at a constant speed, thus striving to deliver a constant volume of hydraulic fluid to the fluid motors. In a modified form, the energy stored in the flywheel is released in a "burst" of power to carry the ram of the punch press through the metal forming cycle.

The U.S. Pat. No. 2,876,704, issued to Collion, discloses a hydraulic transformer which includes a rotor having a plurality of pressure-increasing cylinders circumferentially spaced about the rotational axis thereof, the rotor being mounted for rotational movement within the stationary core. The hydraulic transformer is thus essentially interposed between a fluid supply (pump) and a work cylinder, and the porting in the rotor and the core establishes communication between the hydraulic transformer and the work cylinder and communication between the hydraulic transformer and the pump and container. The circumferentially spaced porting sequentially establishes communication between pairs of the pressure increasing cylinders to deliver a continuous high pressure output to the work cylinder via the secondary fluid circuit, the porting being arranged such that the return movement of the pressure increasing cylinders returns fluid in the primary fluid circuit to the container via ports.

The U.S. Pat. No. 1,841,526, issued to Flanders, shows a metering valve having a block with a central bore and a series of passages in a circular array about the bore and fluid intake and exhaust openings. A piston is disposed in each passage and a rotary valve is located in the central bore with ports connecting the intake ports serially or sequentially to one end of each passage and the opposite end of the same passage to the exhaust ports. The construction of the metering valve is such that the pulses of fluid flow are essentially doubled for each revolution of the valve, and the volume of fluid retained in the chambers is adjustable. The U.S. Pat. No. 2,254,274, issued to Doe, discloses a similar metering device for supplying fluid at a constant pressure to a fluid motor.

The U.S. Pat. No. 700,645, issued to Hartness, shows a flow regulating device having a number of pistons concentrically mounted in a rotating chamber having porting arranged for sequential operation of the pistons to regulate the discharge flow of fluid. The quantity of fluid delivered or discharged from the regulator valve depends on the number of revolutions per minute of the valve, the area of the pistons, and thus the volume of fluid discharged can be controllingly varied by varying the rotating speed of the regulator valve. The U.S. Pat. No. 703,410, issued to Hartness, discloses a similar flow regulating device.

The U.S. Pat. No. 3,641,881, issued to Hashemi, discloses an energy drive system for driving a rotor utilizing two process fluids at different pressure levels. The U.S. Pat. Nos. 2,349,641, issued to Tucker; 280,247, issued to See; and 1,777,293, issued to Curtis; and the French Pat. No. 1,165,249, each disclose various aspects of hydraulic systems.

BRIEF DESCRIPTION OF THE DRAWINGS

FIG. 1 is a cross-sectional view of a control discharge valve constructed in accordance with the present invention.

FIG. 2 is a typical end elevational view of the valve body sections of the control discharge valve of FIG. 1.

FIG. 3 is a cross-sectional view of the control discharge valve of FIG. 1, taken substantially along the lines 3—3 of FIG. 1.

FIG. 4 is a cross-sectional view, similar to FIG. 1, but showing another modified control discharge valve.

FIG. 5 is a cross-sectional view similar to FIGS. 1 and 4, but showing still another modified control discharge valve.

FIG. 6 is a cross-sectional view of a transmission cavity utilized in cooperation with one of the control discharge valves in a hydraulic transmission system constructed in accordance with the present invention.

FIG. 7 is an end elevational view of the first housing section of the transmission cavity of FIG. 6 with the shaft and gear elements removed therefrom and taken substantially along the lines 7—7 of FIG. 6.

FIG. 8 is an end elevational view similar to FIG. 7, but showing the second housing section of the transmission cavity of FIG. 6 with the shaft and gear elements removed therefrom and taken substantially along the lines 8—8 of FIG. 6.

DESCRIPTION OF THE PREFERRED EMBODIMENTS

Figure 9:
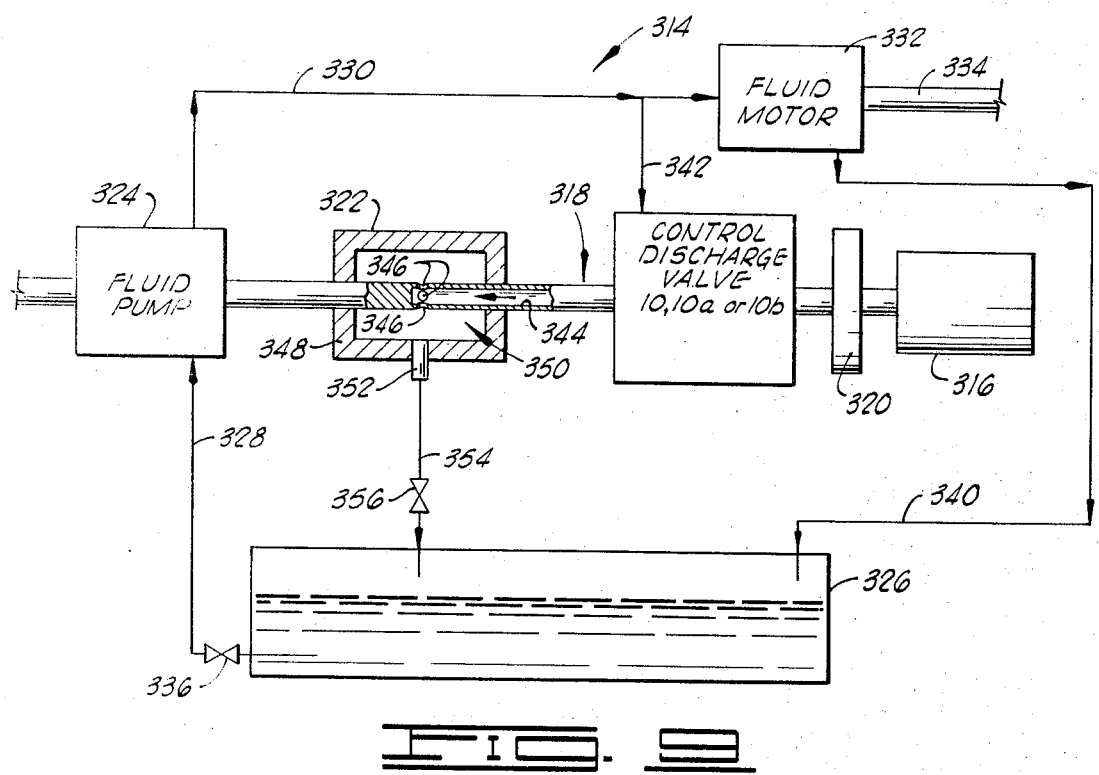
FIG. 9 is a schematic, diagrammatic view of a hydraulic transmission system utilizing the control discharge valve, each constructed and operating in accordance with the present invention.

In general, the present invention provides a hydraulic transmission system wherein a hydraulic power fluid is utilized to control the speed and the torque at the transmission system output shaft in such a manner that the transmission system output shaft is rotated at any speed between zero and the speed of the transmission system input shaft, and in a manner multiplying the torque at the transmission system output shaft by predetermined, controlled ratios of the transmission system output shaft speed divided by the transmission system input shaft speed less than one. The torque applied to the transmission system output shaft is transmitted thereto via the power fluid and a control discharge valve is incorporated in the hydraulic transmission system, the control discharge valve being constructed to bypass a controlled, predetermined, measured amount of the power fluid at controlled intervals of time. The control discharge valve, more particularly, bypasses the power fluid with respect to the transmission system output shaft in impulses occurring at controlled intervals of time, each impulse being of a controlled, predetermined duration. Thus, a controlled, measured amount of power fluid is bypassed and not applied in the hydraulic transmission system at the transmission system output shaft at predetermined intervals of time controlled via the rotational speed of the transmission system input shaft, in one preferred form, and the construction of the control discharge valve, the bypassing of measured amounts of the power fluid at controlled intervals of time resulting in a predetermined, controlled amount of energy which is not applied at the transmission system output shaft during each of the controlled intervals of time wherein a measured amount of power fluid is bypassed with respect to the transmission system output shaft.

The hydraulic transmission system of the present invention also includes an assembly for storing the unused energy or, in other words, the energy not applied at the transmission system output shaft as a result of the bypassing of measured amounts of power fluid at controlled intervals of time, the transmission system being constructed to release and apply the stored energy at the transmission system output shaft in impulses at controlled intervals of time generally corresponding to those intervals of time wherein the transmission system is not bypassing measured amounts of power fluid with respect to the transmission system output shaft. The releasing of the stored energy and the applying of the released stored energy at the transmission system output shaft at controlled intervals of time, sometimes referred to herein as "power pulses," results in impulses of torque applied at the transmission system output shaft, each impulse having an increased torque amplitude with respect to the torque amplitude which would be applied at the transmission system output shaft if none of the power fluid were bypassed. Thus, the hydraulic transmission system of the present invention is constructed to apply a pulsating type of energy to the transmission system output shaft in impulses at controlled intervals of time in such a manner that the torque amplitude during each of the power pulses is substantially increased, in a manner and for reasons to be described in greater detail below.

CONTROL DISCHARGE VALVES

As mentioned before, the hydraulic transmission system of the present invention utilizes a control discharge valve for bypassing measured, predetermined amounts of power fluid with respect to the transmission system output shaft, the present invention also including an improved construction of a control discharge type of valve for utilization in the hydraulic transmission system. Three embodiments of the control discharge valve are shown in the drawings, one embodiment of the control discharge valve being shown in FIGS. 1, 2 and 3 and designated therein via the general reference numeral 10; another embodiment of a control discharge valve being shown in FIG. 4 and designated therein via the general reference numeral 10a; and yet another embodiment of a control discharge valve being shown in FIG. 5 and designated therein via the general reference numeral 10b, each of the control discharge valves 10, 10a and 10b being constructed and operating in a manner to be described in greater detail below.

Referring more particularly to the control discharge valve 10 shown in FIGS. 1, 2 and 3, the control discharge valve 10 includes: a valve body 12 comprising a first valve body section 14 and a second valve body section 16; and a rotor 18 rotatingly supported within a portion of the valve body 12. The valve body 12 is constructed and positioned with respect to the transmission system input shaft to remain in a stationary position while the rotor 18 is rotated during the operation of the control discharge valve 10, in a manner and for reasons to be described in greater detail below.

The valve body 12 has opposite ends 20 and 22 and a rotor chamber 24 formed within a central portion thereof, the rotor chamber 24 being sized to receive and encompass the rotor 18 in an assembled position of the control discharge valve 10. As shown more clearly in FIGS. 2 and 3, the valve body 12 is, in one preferred form, cylindrically shaped and the bores formed through a portion of each of the first and the second valve body section 14 and 16 cooperate in an assembled position of the valve body 12 to form a cylindrically shaped rotor chamber 24 formed and disposed in a central portion of the valve body 12. A shaft opening 26 is formed through a central portion of the end 20 and a shaft opening 28 is formed through the end 22 of the valve body 12, the shaft openings 26 and 28 being axially aligned and each intersecting a portion of the rotor chamber 24 of the valve body 12. Each of the shaft openings 26 and 28 are sized to receive a portion of a shaft rotatingly extended therethrough in a stationary position of the valve body 12, as will be described in greater detail below.

The first and the second valve body sections 14 and 16 of the valve body 12 are similarly constructed, each of the first and the second valve body sections 14 and 16 having opposite ends 30 and 32 and a bore 34 formed through each of the ends 32 extending a distance into the respective valve body sections 14 and 16 terminating with a wall 36. A fluid opening 38 is formed through the end 30 of the first valve body section 14 intersecting a portion of the bore 34 therein and a fluid opening 40 is formed through the end 30 of the second valve body section 16 intersecting a portion of the bore 34 formed therein. The shaft opening 26 is, more particularly, formed through a central portion of the end 30 of the first valve body section 14 and the shaft opening 28 is, more particularly, formed through a central portion of the end 30 of the second valve body section 16, each of the shaft openings 26 and 28 intersecting portions of the bore 34 formed in the valve body sections 14 and 16.

An annular recess 42 is formed in a central portion of each wall 36 of the first and the second valve body sections 14 and 16. Each recess 42 extends a distance through the respective valve body sections 14 and 16, the recess 42 of the first valve body section 14 intersecting and surrounding the shaft opening 26 and the recess 42 of the second valve body section 16 intersecting and surrounding the shaft opening 28, as shown more clearly in FIG. 2. A radial recess 44 is formed a distance through each wall 36 of the first and the second valve body sections 14 and 16, each radial recess 44 intersecting a portion of one of the annular recesses 42 and extending a distance radially therefrom, for reasons to be made more apparent below.

An annular flange 46 is formed on the end 32 of each of the first and the second valve body sections 14 and 16. Each annular flange 46 extends a distance radially from the respective valve body section 14 and 16, each annular flange 46 including a plurality of bolt holes 47 formed therethrough and spaced circumferentially thereabout.

In an assembled position of the valve body 12, the first valve body section 14 is positioned with respect to the second valve body section 16 such that the surfaces of the ends 32 matingly abut and the bolt holes formed through each of the flanges 46 are aligned, bolt type fasteners 48 being disposed through the aligned openings in the flanges 46 securing the first and the second valve body sections 14 and 16 in an assembled position. As shown more clearly in FIG. 1, the radial recess 44 of the first valve body section 14 is oriented to extend in one direction and the radial recess 44 of the second valve body section 16 is oriented to extend in a generally opposite direction with respect to the disposition of the radial recess 44 of the first valve body section, in an assembled position of the valve body 12.

Thus, the first valve body section 14 is rotated 180° in orientation with respect to the orientation of the second valve body section 16, in an assembled position of the first and the second valve body sections 14 and 16. In the assembled position of the valve body 12, the radial recess 44 and the annular recess 42 in the first valve body section 14 form a fluid passageway 50 having a portion extending annularly about the shaft opening 26 and another portion extending radially therefrom and the radial recess 44 and the annular recess 42 in the second valve body section 16 form a fluid passageway 52 having one portion extending annularly about the shaft opening 28 and another portion extending radially therefrom, for reasons to be made more apparent below.

The rotor 18 has opposite ends 54 and 56 and, in a preferred form, is cylindrically shaped having an outer periphery 58, as shown in FIGS. 1 and 3. The outside diameter of the rotor 18 formed via the outer periphery 58 is less than the diameter formed via the rotor chamber 24 in the valve body 12 and the length of the rotor 18 generally between the opposite ends 54 and 56 thereof is slightly less than the length of the rotor chamber 24 generally between the walls 36 of the first and the second valve body sections 14 and 16 so that the rotor 18 can be rotated within the rotor chamber 24.

A rotor shaft 60 is secured to a central portion of the end 54 of the rotor 18, the rotor shaft 60 extending a distance axially from the rotor 18 and a portion of the rotor shaft 60 being journally supported within the shaft opening 26 in the valve body 12. A rotor shaft 62 is secured to the end 56 of the rotor 18, the rotor shaft 62 extending a distance axially from the end 56 of the rotor 18 and a portion of the rotor shaft 62 being journally supported within the shaft opening 28 of the valve body 12. In an assembled position of the valve body 12 and the rotor 18, the rotor 18 is thus rotatingly supported within the rotor opening 24 of the valve body 12 via the rotor shafts 60 and 62 extending through the shaft openings 26 and 28 of the valve body 12. The rotor 18 is, more particularly, supported within the rotor chamber 24 such that a clearance 64 exists between the outer periphery 58 of the rotor 18 and the walls formed in the valve body 12 via the rotor chamber 24, and the length of the rotor 18 is sized with respect to the length of the rotor chamber 24 such that a minimum clearance exists between the ends 54 and 56 of the rotor 18 and the adjacent portions of the wall 36 formed in the valve body 12 such that the rotor 18 is rotatingly supported within the rotor chamber 24 of the valve body 12 in a manner reducing the leakage of power fluid between adjacent portions of the rotor 18 and the valve body 12 during the operation of the control discharge valve 10, for reasons and in a manner to be made more apparent below.

As shown in FIGS. 1 and 3, the rotor 18 also includes a plurality of rotor openings 66 spaced at equidistant positions circumferentially about the rotor 18, generally near the outer periphery 58 thereof. Each of the rotor openings 66 extends axially through the rotor 18 intersecting the opposite ends 54 and 56 thereof and each of the rotor openings 66 are spaced at equidistant points circumferentially within the rotor 18, each rotor opening 66 being thus spaced an arcuate distance 68 from the adjacent rotor openings 66, as shown in FIG. 3 with respect to three of the rotor openings 66. It should be noted that, although the rotor openings 66 are shown in the drawings and described as being spaced circumferentially about the rotor 18 at equidistant points, it is not necessary for the spacing to be equal and, in any particular application, the spacing may be varied to achieve a specific result.

The rotor openings 66 are, more particularly, spaced and positioned through the rotor 18 such that one of the rotor openings 66 is aligned with the fluid opening 38 and the fluid passageway 52 formed in the valve body 12 and one other rotor opening 66 is aligned with the fluid opening 40 and the fluid passageway 50 formed in the valve body 12 at each rotational position of the rotor 18 when the rotor has rotated through a rotational distance substantially equal to the arcuate distance or spacing 68 between the rotor openings 66. The rotational positions of the rotor 18 wherein one of the rotor openings 66 is aligned with the fluid opening 38 in the fluid passageway 52 and another of the rotor openings 66 is aligned with the fluid opening 40 and the fluid passageway 50 in the valve body 12 are sometimes referred to herein as "bypass positions" of the rotor 18. In one form, as shown in FIG. 3, the rotor 18, more particularly, includes eight rotor openings 66 and, since the fluid opening 38 in the fluid passageway 52 is disposed 180° from the fluid opening 40 and the fluid passageway 50 in the valve body 12, when one of the rotor openings 66 is rotated into a bypass position aligned with one of the fluid openings and one of the fluid passageways, one other rotor opening 66 is simultaneously rotated to a bypass position aligned with the other fluid opening and the other fluid passageway in the valve body 12, in the embodiment of the invention shown in the drawings. In some applications of the invention, the rotor openings, the fluid passageways and the fluid openings may be oriented such that the alignment of the rotor openings with the fluid openings and fluid passageways does not occur simultaneously, the simultaneous alignment being described with respect to the particular construction and alignment of the embodiment of the invention shown in the drawings.

As shown more clearly in FIG. 1, a pair of spaced stops 70 are removably secured in the rotor 18 within each of the rotor openings 66, one of the stops 70 in each of the rotor openings 66 being disposed generally near the end 54 of the rotor 18 and the other stop 70 disposed within each of the rotor openings 66 being disposed generally near the end 56 of the rotor 18. Each of the stops 70 includes a portion extending a distance radially into a portion of one of the rotor openings 66.

A cylindrically shaped plunger 72 is slidingly disposed within each of the rotor openings 66 for sliding movement therein in a direction 74 generally toward the end 54 of the rotor 18 and in a direction 76 generally toward the end 56 of the rotor 18. The radially extending portions of each of the stops 70 disposed generally near the end 54 of the rotor 18 are each, more particularly, sized and positioned to engage one end portion of one of the plungers 72 limiting the movement of the engaged plunger 72 in a direction 74 and radially extending portions of each of the other stops 70 disposed generally near the end 56 of the rotor 18 is sized and positioned to engage a portion of one of the plungers 72 limiting the movement of the engaged plunger 72 in a direction 76 generally toward the end 56 of the rotor 18. Thus, each of the plungers 72 is sized and disposed for sliding movement in one of the rotor openings 66 in directions 74 and 76 generally between the stops 70 disposed and secured within each of the rotor openings 66, for reasons to be made more apparent below.

As shown more clearly in FIG. 1, a shaft opening 78 is formed in the rotor shaft 60 and extends a distance axially therethrough. A shaft opening 80 is formed through a central portion of the rotor 18 extending axially therethrough and intersecting the opposite ends 54 and 56 thereof and a shaft opening 82 is formed through a portion of the rotor shaft 62 generally near and intersecting the end portion thereof secured to the end 56 of the rotor 18. The shaft openings 78, 80 and 82 are axially aligned in an assembled position of the rotor 18 and the rotor shafts 60 and 62 to provide fluidic communication therethrough.

In one form, the rotor shafts 60 and 62 can be formed integrally with the rotor 18 and the shaft openings 78, 80 and 82 can be formed by boring a single opening extending through the rotor shaft 60, through the central portion of the rotor 18 and a distance into a portion of the rotor shaft 62, generally near the end thereof connected to the end 56 of the rotor 18. In any event, a plurality of transverse shaft openings 84 (three of the transverse shaft openings 84 being shown in FIG. 1) are formed through the rotor shaft 60 generally near the portion thereof connected to the rotor 18, each of the transverse shaft openings 84 extending transversely through and intersecting the shaft opening 78 formed through the rotor shaft 60. A plurality of transverse shaft openings 86 (three of the transverse shaft openings 86 being shown in FIG. 1) are formed through a portion of the rotor shaft 62 generally near the end thereof connected to the end 56 of the rotor 18, each of the transverse shaft openings 86 extending generally transversely through and intersecting the shaft opening 82 formed in the rotor shaft 62.

In an assembled position, the rotor 18 is rotatingly supported within the rotor chamber 24 of the valve body 12 via the rotor shafts 60 and 62 and the transverse shaft openings 84 are positioned to provide fluidic communication with the fluid passageway 50 or, more particularly, with the annular recess 42 portion of the fluid passageway 50, the transverse shaft openings 86 being positioned to provide fluidic communication with the fluid passageway 52 or, more particularly, with the annular recess 42 portion of the fluid passageway 52 in the valve body 12. Thus, fluidic communication is provided through the shaft openings 78, 80 and 82 with the fluid passageways 50 and 52 of the valve body 12 via the transverse shaft openings 84 and 86, respectively, for reasons which will be made more apparent below.

The control discharge valve 10, described in detail above, is utilized, in one preferred form, to bypass a predetermined, measured amount of power fluid therethrough at controlled, predetermined intervals of time related to the rotational speed of the rotor shafts 60 and 62, the particular number of rotor openings 66, the arcuate spacing or distance 68 between the rotor openings 66, the volumetric size of each of the rotor openings 66, the length of the plunger 72, the length of travel of the plunger 72 and the spacing of the stops 70. In practice and in a particular operational embodiment utilizing the control discharge valve 10, the fluid openings 38 and 40 formed through the valve body 12 are connectable to operate in the nature of either inlet or outlet fluid openings and the shaft openings 78, 80 and 82 together with the fluid passageways 50 and 52 in the valve body 12 are also constructed and positioned to function in the nature of either inlet or outlet fluid openings in a particular operational embodiment of the control discharge valve 10, as will be made more apparent below.

Assuming the control discharge valve 10 is connected to a hydraulic transmission system or the like such that the fluid openings 38 and 40 in the valve body 12 are connected to function in the nature of fluid outlets accommodating the flow of the measured, controlled amount of power fluid discharged through the control discharge valve 10 during the operation thereof and the shaft openings 78, 80 and 82 and the fluid passageways 50 and 52 are connected to function in the nature of fluid inlets in this particular operational embodiment of the control discharge valve 10, for example, one of the rotor shafts 60 or 62 is connected to a prime mover (not shown) or other such power source constructed to impart rotational motion thereto for rotating the rotor 18 within the rotor chamber 24 at a predetermined rotational speed.

In this assumed operational embodiment of the control discharge valve 10, the power fluid to be bypassed or discharged therethrough is connected to and enters via the shaft openings 78, 80 and 82 at an elevated, predetermined pressure level, the power fluid entering via the shaft openings 78, 80 and 82 flowing through the transverse shaft openings 84 into the fluid passageway 50 and flowing through the transverse shaft openings 86 into the fluid passageway 52. The rotation of the rotor 18 via the prime mover (not shown) will sequentially move each of the rotor openings 66 into an aligned position fluidically communicating with the fluid passageway 50, the rotation of the rotor 18 also sequentially moving each of the rotor openings 66 into aligned positions fluidically communicating with the fluid passageway 52 in the valve body 12.

More particularly, referring to the embodiment of the rotor 18, as shown more clearly in FIG. 3, wherein eight rotor openings 66 are formed through the rotor 18, one of the rotor openings 66 will be moved into an aligned position fluidically communicating with the fluid passageway 50 and the fluid opening 40 during each incremental degree of rotation of the rotor 18 through a rotational or arcuate angle 68 equal to the arcuate distance 68 between adjacent rotor openings 66. Further, as each rotor opening 66 is moved to one bypass position aligned with the fluid passageway 50 and the fluid opening 40 in the valve body 12, the rotor opening 66 diametrically opposed or, in other words, disposed 180° from the aligned rotor opening 66 will be positioned in one bypass position aligned with the fluid passageway 52 and fluid opening 38 in the valve body 12. Thus, in each bypass position of the rotor 18 one of the openings 66 is aligned and in fluidic communication with the fluid passageway 50 and the fluid opening 40 and one other rotor opening 66 is aligned with and in fluidic communication with the fluid passageway 52 and the fluid opening 38 in the valve body 12, the rotor 18 being shown in FIG. 1 in one bypass position thereof. If there were an odd number of rotor openings 66 in one operational embodiment of the invention, for example, the operation of the control discharge valve would be similar; but, the alignment of the rotor openings, the fluid passageways and the fluid openings would occur sequentially at a time dependent primarily upon the orientation of the rotor openings and the fluid passageways and the fluid openings.

In each bypass position of the rotor 18, the power fluid disposed in the fluid passageway 50 is forced through the aligned rotor opening 66 in fluidic communication therewith forcing and biasingly sliding the plunger 72 disposed in the aligned rotor opening 66 in a direction 76 generally toward the end 56 of the rotor 18, and the fluid disposed in the fluid passageway 52 is forced through the aligned rotor opening 66 in fluidic communication therewith forcing and biasingly moving the plunger 72 disposed in the aligned rotor opening 66 in a direction 74 generally toward the end 54 of the rotor 18. In this bypass position of the rotor 18, one of the plungers 72 is biased via the power fluid in the fluid passageway 50 in a direction 76 to a position wherein the plunger engages the stop 70 disposed generally adjacent near the end 56 of the rotor 18 and the plunger 72 is biased via the fluid in the fluid passageway 52 in fluidic communication therewith in a direction 74 to a position wherein the plunger 72 engages the stop 70 disposed generally adjacent and near the end 54 of the rotor 18, the stops 70 engaging the plungers 72 and limiting the movement of the plungers 72 in the directions 74 and 76. The rotor opening 66 aligned with the fluid passageway 50 will be filled with power fluid from the fluid passageway 50 generally between the plunger 72 and the end of the rotor opening 66 intersecting the end 54 of the rotor 18, and the rotor opening 66 in fluidic communication with the fluid passageway 52 is filled with power fluid from the fluid passageway 52 generally between the plunger 72 and the end of the rotor openings 66 intersecting the end 56 of the rotor 18.

As the rotor 18 is rotated from this bypass position through an incremental degree of rotation less than the arcuate distance 68 between the rotor openings 66, the openings formed in the ends 54 and 56 of the rotor 18 via the rotor openings 66 are each positioned adjacent portions of the walls 36 formed in the valve body 12, the walls 36 in the valve body 12 cooperating to seal the opposite ends of each of the rotor openings 66 in what is sometimes referred to herein as a "closed position" of the rotor 18. In the closed or non-bypassing positions of the rotor 18 wherein none of the openings 66 are aligned nor in fluidic communication with the fluid passageways 52 and 50 and the fluid openings 38 and 40 of the valve body 12, a measured amount of power fluid is retained within each rotor opening 66 generally between the plungers 72 and the opposite end portions of each of the rotor openings 66. Thus, in the closed positions of the rotor 18, power fluid does not flow through the shaft openings 78, 80 and 82 into the fluid passageways 52 and 50 of the valve body 12 nor is any power fluid flowing through the fluid openings 38 and 40 of the valve body 12, although the shaft openings 78, 80 and 82 and the fluid passageways 50 and 52 remain filled with power fluid.

Referring to the two rotor openings 66, shown in FIG. 1, after the rotor 18 has been positioned in the one bypass position shown therein and described above, the rotor 18 is further rotated to another bypass position wherein the rotor openings 66 previously aligned and in fluidic communication with the fluid passageway 50 and the fluid opening 40 are then aligned and in fluidic communication with the fluid passageway 52 and the fluid opening 38 and the rotor opening 66 previously aligned and in fluidic communication with the fluid opening 38 and the fluid passageway 52 is moved into an aligned position in fluidic communication with the fluid passageway 50 and the fluid opening 40, each of the rotor openings 66 are alternately positioned in fluidic communication with one of the fluid passageways 50 and 52 and one of the fluid openings 40 and 38. Each of the rotor openings 66 is thus sequentially positioned in a bypass position with respect to the fluid passageway 50 wherein the fluid disposed in the fluid passageway 50 biasingly slides and moves the plunger 72 disposed therein toward the end 56 of the rotor 18 and each of the rotor openings 66 is subsequently rotated through 180° into one other bypass position aligned with the other fluid passageway 52 wherein the power fluid disposed in the fluid passageway 52 biases the plunger disposed in the rotor opening 66 in the opposite direction 74 generally toward the end 54 of the rotor 18.

As each of the plungers 72 is moved in one of the directions 74 and 76 in bypass positions of the rotor 18, the plungers 72 each move the power fluid disposed within the respective rotor openings 66 in a direction corresponding to the direction of movement of the plungers 72 biasingly forcing the power fluid previously disposed within the rotor openings 66 therefrom. Thus, the fluid passageway 50 and the aligned fluid opening 40 are each positioned in the valve body 12 such that the power fluid disposed in the fluid passageway 50 is sequentially moved into each of the rotor openings 66 as the rotor openings 66 are positioned in bypass positions with respect to the fluid passageway 50 and the fluid opening 40, the moving of the power fluid from the fluid passageway 50 into the aligned rotor openings 66 slidingly moving one of the plungers 72 in a direction 76 forcing the power fluid previously disposed in the aligned rotor opening 66 therefrom and out the aligned fluid opening 40. By the same token, the fluid passageway 52 and the aligned fluid opening 38 in the valve body 12 are positioned with respect to the rotor openings 66 such that each of the rotor openings 66 is sequentially positioned in a bypass position aligned with the fluid passageway 52 and fluid opening 38, the power fluid disposed within the fluid passageway 52 being forced into each rotor opening 66 aligned therewith in a direction 74 slidingly biasing the plungers 72 in the direction 74 and moving the power fluid previously disposed therein from the fluid passageway 52 generally out the fluid opening 38. In summary, the fluid passageways 52 and 50 and the fluid openings 38 and 40 are positioned in the valve body 12 with respect to the rotor openings 66 through the rotor 18 such that, in each bypass position of the rotor 18, the power fluid from each of the fluid passageways 52 and 50 fills a portion of the rotor opening 66 aligned and in fluidic communication therewith and simultaneously forces the power fluid subsequently disposed within the aligned rotor openings 66 generally out the fluid openings 38 and 40, respectively.

Since one of the rotor openings 66 is aligned with the fluid passageway 50 and fluid opening 40 and one other of the rotor openings 66 is aligned with the fluid passageway 52 and the fluid opening 38 at each bypass position of the rotor 18, a volumetric amount of power fluid substantially equal to twice the volume of one of the rotor openings 66 less twice the volume of one of the plungers 72 is discharged via the fluid openings 38 and 40 approximately one-half of the volumetric amount of power fluid being discharged via the fluid opening 38 and the other one-half of the power fluid being discharged via the fluid opening 40. This predetermined, controlled amount of power fluid discharged via the control discharge valve 10 in each bypass position thereof is thus also dependent upon the volumetric size of each of the plungers 72.

From the foregoing detailed description, it will be apparent to those skilled in the art that the hydraulic power fluid can be connected, in one other preferred operational embodiment of the control discharge valve 10, to the fluid openings 38 and 40 and the power fluid bypassed via the control discharge valve 10 is then bypassed via the fluid passageways 52 and 50 and the shaft openings 78, 80 and 82. The control discharge valve 10, in this operational embodiment, functions to bypass the predetermined amount of power fluid at each bypass position thereof in a manner substantially the same as that described before except that the power fluid is bypassed via the shaft openings 78, 80 and 82 rather than the fluid openings 38 and 40 which may be desirable in some applications. In either event, the operation of the control discharge valve in specific hydraulic transmission systems will be described in further detail below.

Control Discharge Valve 10a

The control discharge valve 10a, shown in FIG. 4, is constructed and operates in a manner similar to the control discharge valve 10, shown in FIGS. 1, 2 and 3, described in detail above, one of the differences being that a pair of plungers 72a are slidingly disposed in each rotor opening 66a and a control fluid opening 100 is formed in a portion of the valve body 12a intersecting and extending annularly about a central portion of the rotor chamber 34a. A control fluid port 102 is formed through the second valve body section 16a intersecting and fluidically communicating with a portion of the control fluid opening 100. The control fluid opening 100 and the control fluid port 102 are each positioned and connected to receive a control fluid during the operation of the control discharge valve 10a, for reasons and in a manner to be described in greater detail below.

A pair of central stops 104 and 106 are secured in the rotor 18a, the central stops 104 and 106 each including portions extending a distance into the rotor openings 66a and being spaced a predetermined distance apart, as shown in FIG. 4 with respect to two of the rotor openings 66a of the control discharge valve 10a. A plurality of rotor control fluid openings 108 are formed through the outer periphery 58a of the rotor 18a, each rotor control fluid opening 108 intersecting one of the rotor openings 66a and each being positioned to provide fluidic communication between the control fluid opening 100 and a central portion of one of the rotor openings 66a, for reasons to be made more apparent below.

An annular recess 110 is formed in the end 32a of each of the first and the second valve body sections 14a and 16a, each annular recess 110 intersecting a portion of the valve body section bore 34a. The annular recesses 110 are each positioned and sized such that, in an assembled position of the first and the second valve body sections 14a and 16a forming the valve body 12a, the annular recesses 110 cooperate to form the annular control fluid opening 100.

The central stops 104 and 106 disposed in each of the rotor openings 66a are, more particularly, positioned in each rotor opening 66a such that the central stop 104 is disposed on one side of the rotor control fluid opening 108 and the central stop 106 is disposed on the opposite side of the rotor control fluid opening 108. Thus, the central stops 104 and 106 in each rotor opening 66a are spaced a predetermined distance apart and the rotor control fluid opening 108 is disposed between the central stops 104 and 106. One of the plungers 72a in each rotor opening 66a is disposed between the stop 70a, generally near the end 54a of the rotor 18a, and the central stop 104, and the other plunger 72a in each rotor opening 66a is disposed between the stop 70a, generally near the end 56a of the rotor 18a, and the central stop 106, each plunger 72a in each rotor opening 66a being reciprocatingly slid in directions 112 and 114 between one of the stops 70a and one of the central stops 104 and 106 during the operation of the control discharge valve 10a.

As mentioned before, the control discharge valve 10a will operate in a manner similar to the control discharge valve 10, the salient difference being that the measured amount of power fluid bypassed through the control discharge valve 10a is controllably varied via a control fluid connected to the control fluid port 102 in the valve body 12a. The control fluid from a control fluid source (not shown) enters and fills the control fluid opening 100 via the control fluid port 102, the control fluid subsequently entering and filling a portion of each rotor opening 66a generally between the two plungers 72a via the rotor control fluid openings 108. The control fluid is thus positioned within each of the rotor openings 66a to bias each of the plungers 72a disposed therein in opposite directions generally toward the ends 54a and 56a of the rotor 18a, the biasing force exerted on each of the plungers 72a being a function of the pressure level of the control fluid relative to the pressure level of the power fluid.

During the operation of the control discharge valve 10a, the rotor 18a is rotated to bypass positions and to closed positions in a manner similar to that described before with respect to the control discharge valve 10; however, in bypass positions of the control discharge valve 10a wherein one of the rotor openings 66a is aligned with the fluid passageway 50 and the fluid opening 40 and one other rotor opening 66a is aligned with the fluid passageway 52 and the fluid opening 38, as shown in FIG. 4, a portion of each rotor opening 66a receives a portion of power fluid from one of the fluid passageways 52 and 50 and the power fluid previously disposed within each rotor opening 66a is discharged therefrom via one of the fluid openings 38 and 40. More particularly in the bypass position of the two rotor openings 66a shown in FIG. 4, the power fluid from the fluid passageway 50 enters the rotor opening 66a aligned therewith biasing one of the plungers 72a in a direction 112 filling a portion of the aligned rotor opening 66a with power fluid, the plunger 72a biased via the power fluid biasing the other plunger 72a in a direction 112 via the control fluid disposed therebetween forcing the power fluid disposed between that plunger 72a and the stop 70a near the rotor end 56a out the fluid opening 40 aligned therewith. By the same token, the power fluid from the fluid passageway 52 enters the rotor opening 66a aligned therewith biasing one of the plungers in a direction 114 filling a portion of the aligned rotor opening with power fluid, the plunger 72a biased via the power fluid biasing the other plunger 72a in a direction 114 via the control fluid disposed therebetween forcing the power fluid disposed between that plunger 72a and the stop 70a near the rotor end 54a out the fluid opening 38 aligned therewith.

From the foregoing it will be apparent to those skilled in the art that the distance each plunger 72a travels within the rotor opening 66a is controllable via increasing and decreasing the volume of the control fluid disposed between each pair of plungers 72a within each rotor opening 66a, thereby controlling the measured amount of power fluid disposed within and subsequently discharged from each rotor opening 66a. The total volumetric amount of power fluid bypassed via the control discharge valve 10a is thus controllably varied via varying the volume of the control fluid.

In one preferred form, schematically shown in FIG. 4, a piston 115 reciprocatingly disposed within a piston chamber 116 is interposed between the control fluid source (not shown) and the control discharge valve 10a. The power fluid received within the fluid passageways 50 and 52 is thus connected to the piston chamber 116 (as schematically indicated via the power fluid arrow 117), such that the power fluid is disposed generally on one side of the piston 115 and the control fluid entering the piston chamber 116 from the control fluid source (not shown) as schematically indicated via the control fluid arrow 118, is disposed generally on the opposite side of the piston 115. In this manner the volume of the control fluid connected to the control discharge valve 10a, as schematically indicated via the control fluid arrow 119, is automatically varied via the piston 115 in response to changes in power fluid pressure which may be desirable in some applications. The present invention contemplates that the piston 115 is moved within the chamber 116 via an external power source (not shown) and the power fluid connected thereto augments the action of the external power source facilitating the movement of the piston 115 in a manner requiring less power at the external power source.

Control Discharge Valve 10b

Another modified control discharge valve 10b is shown in FIG. 5, the control discharge valve 10b being constructed and operating in a manner similar to that described before with respect to the control discharge valves 10 and 10a to discharge or bypass a predetermined, controlled, measured amount of power fluid therethrough in bypass positions thereof, one of the differences being that the control discharge valve 10b includes a mechanical adjustment assembly 120 for mechanically varying and adjusting the amount of power fluid to be bypassed through the control discharge valve 10b during the operation thereof. The control discharge valve 10b includes a valve body 122 and a rotor 124 rotatingly disposed within the valve body 122, the rotor 124 being connected to a pair of rotor shafts 126 and 128 and rotatingly supported within a portion of the valve body 122, in a manner and for reasons similar to that described before with respect to the rotors 18 and 18a and in a manner to be described in greater detail below.

The valve body 122 is preferably cylindrically shaped having an outer periphery 130 and opposite ends 132 and 134. A rotor chamber 136 is formed through the end 134 of the valve body 122, the rotor chamber 136 extending a distance through the valve body 122 generally toward the end 132 and terminating with a wall 138. A cover plate 140 is secured to the end 134 of the valve body 122 via a plurality of bolt type fasteners 142, and a shaft opening 144 is formed through a central portion of the cover plate 140, the shaft opening 144 receiving and journally supporting a portion of the rotor shaft 128 disposed therethrough, in an assembled position of the control discharge valve 10b.

A fluid opening 146 is formed through the end 132 of the valve body 122, the fluid opening 146 intersecting a portion of the rotor chamber 136. An annular recess 148 is formed in the wall 138 of the valve body 122, the annular recess 148 intersecting a shaft opening 150 formed through a central portion of the end 132 of the valve body 122 and being disposed annularly thereabout. A radial recess 151 is also formed in the wall 138 of the valve body 122, a portion of the radial recess 151 intersecting the annular recess 148 and extending a predetermined distance radially from the shaft opening 150 formed through the end 132 of the valve body 122. The annular recess 148 and the radial recess 151 cooperate to form a fluid passageway 152 in a manner and for reasons similar to that described before with respect to the fluid passageways 50 and 52 formed in the valve bodies 12 and 12a.

The rotor 124 has opposite ends 154 and 156 and, in a preferred form, is cylindrically shaped having an outer periphery 158. The diameter of the rotor 124 is sized to be less than the diameter formed via the rotor chamber 136 so that the rotor 124 can be rotatingly supported within the rotor chamber 136 via the rotor shafts 126 and 128, in a manner similar to that described before with respect to the control discharge valves 10 and 10a.

The rotor shaft 126 is, more particularly, secured to or, in one form, formed on a central portion of the end 154 of the rotor 124, the rotor shaft 126 extending a distance generally perpendicularly from the end 154 of the rotor 124 through the shaft opening 150. A shaft opening 160 is formed through a central portion of the rotor shaft 126, the shaft opening 160 extending axially through the rotor shaft 126 terminating generally near the connection between the rotor shaft 126 and the rotor 124. A plurality of transverse shaft openings 162 (two of the transverse shaft openings 162 being shown in FIG. 5) are formed through the rotor shaft 126, generally near the connection between the shaft 126 and the end 154 of the rotor 124, the transverse shaft openings 162 extending transversely through the rotor shaft 126 intersecting a portion of the shaft opening 160 therethrough. The transverse shaft openings 162 are positioned through the rotor shaft 126 such that, in an assembled position of the control discharge valve 10b, fluidic communication is established between the shaft opening 160 and the fluid passageway 152 via the transverse shaft openings 162, in a manner and for reasons similar to that described in detail before with respect to the fluid passageways 50 and 52 and the transverse openings 84 and 86 of the control discharge valves 10 and 10a. Also, in a manner similar to that described before with respect to the control discharge valves 10 and 10a, the fluid opening 146 can be connected to function in the nature of a fluid inlet or fluid discharge in any particular operational embodiment of the control discharge valve 10b and, by the same token, the shaft opening 160 can also be connected to function in the nature of a fluid inlet or a fluid discharge in any particular operational embodiment of the control discharge valve 10b.

The rotor 124 includes a plurality of rotor openings 164 (two rotor openings 164 being shown in FIG. 5) formed through the rotor 124 intersecting the opposite ends 154 and 156 thereof. The rotor openings 164 are, more particularly, spaced circumferentially about the rotor 124, each rotor opening 164 being spaced a predetermined arcuate distance from the adjacent rotor openings in a manner similar to that described before with respect to the rotor openings 66 and 66a and as shown in detail in FIG. 3 with respect to the rotor openings 66 of the control discharge valve 10.

Each of the rotor openings 164 is sized to receive one end portion of a plunger 166, two of the plungers 166 being shown in FIG. 5 disposed within the rotor openings 164. In a preferred form, each of the plungers 166 is generally cylindrically shaped and has opposite ends 168 and 170 and a plunger stop 172 connected or formed on a portion of each of the plungers 166, generally between the opposite ends 168 and 170 thereof. The plunger stops 172 each include portions extending radially outwardly from the outer periphery of the plunger 166 connected thereto, the radially extending portions forming a pair of engaging surfaces 174 and 176 extending circumferentially about the plungers 166, for reasons to be made more apparent below.

The plunger stop 172 is, more particularly, positioned on each of the plungers 166 such that the distance between the engaging surface 174 and the end 168 of each of the plungers 166 is substantially the same as or less than the axial length of the rotor 124 generally between the ends 154 and 156 thereof or, more particularly, less than the axial length of the rotor openings 164. The end 168 of each of the plungers 166 is slidingly disposed through the end of one of the rotor openings 164 generally near the end 156 of the rotor 124, each plunger 166 extending through one of the rotor openings 164 to a position wherein the engaging surfaces 174 of the plunger stops 172 engage adjacent portions of the end 156 of the rotor 124 limiting the movement of the plungers 166 through the rotor openings 164 in a direction 178. A portion of each of the plungers 166 extending between the plunger stops 172 and the ends 170 is slidingly disposed through a plunger opening 180, the plunger openings 180 each being formed through a plunger guide 182.

The plunger guide 182 is, more particularly, cylindrically shaped having an outer periphery 184, the plunger guide 182 being disposed in the rotor chamber 136 generally between the end 156 of the rotor 124 and the cover plate 140 of the valve body 122. The plunger openings 180 formed through the plunger guide 182 are spaced circumferentially about the plunger guide 182 and disposed generally near the outer periphery 184, the spacing between the plunger openings 180 corresponding to the arcuate spacing between each of the rotor openings 164 and each of the plunger openings 180 being axially aligned with one of the rotor openings 164 in an assembled position of the plunger guide 182 within the rotor chamber 136 of the valve body 122. The plunger guide 182 is, more particularly, slidingly disposed within the rotor chamber 136 of the valve body 122 generally between the end 156 of the rotor 124 and the cover plate 140 of the valve body 122 such that the plunger guide 182 can be slid in an axial direction 178 and in an axial direction 186 through the rotor chamber 136, for reasons and in a manner to be made more apparent below.

An elongated sleeve type bearing 188 is secured to the rotor shaft 128, the bearing 188 being bearingly and slidingly disposed through a shaft opening 190 formed through a central portion of the plunger guide 182. Thus, the plunger guide 182 is, more particularly, supported within the rotor chamber 136 of the valve body 122 on the bearing 188 secured to the rotor shaft 128, the plunger guide 182 being positioned and sized to be slidingly moved in directions 178 and 186 on the bearing 188.

A raised hub portion 192 is formed on a central portion of the plunger guide 182, the hub 192 extending generally about the shaft opening 190. A recess 194 is formed in the outer periphery of the hub 192, for reasons to be made more apparent below.

A plunger spring 196 is disposed about each of the plungers 166, each plunger spring 196 extending between the plunger stop 172 and the end 170 of one of the plungers 166. More particularly, and in an assembled position of the control discharge valve 10b, each plunger spring 196 is secured about a portion of one of the plungers 166 such that one end of each of the plunger springs 196 engages the engaging surface 176 of one of the plunger stops 172 and the opposite end of each of the plunger springs 196 engages a portion of the plunger guide 182, each of the plunger springs 196 biasing the plunger 166 connected thereto in a direction 178 via a biasing force dependent upon the plunger springs 196 and the distance or spacing between the end 156 of the rotor 124 and the plunger guide 182.

As mentioned before, the modified control discharge valve 10b includes a mechanical adjusting assembly 120, the mechanical adjusting assembly 120 being more particularly constructed to controllingly adjust the travel of the plungers 166, thereby controlling the measured amount of power fluid bypassed through the control discharge valve 10b.

The mechanical adjusting assembly 120 includes an adjusting rod 200 extending through an opening 202 formed through the cover plate 140. A retaining ring 204 is secured to one end of the adjusting rod 200, the retaining ring 204 being disposed within a portion of the recess 194 formed in the outer periphery of the hub 192 of the plunger guide 182. The end of the adjusting rod 200, opposite the end secured to the retaining ring 204, is extended through the opening 202 in the cover plate 140 and an adjusting nut 206 is threadedly secured to a threaded portion of the adjusting rod 200 extending beyond the cover plate 140.

The adjusting rod 200 is thus retainingly secured to a portion of the plunger guide 182 and includes a portion extending beyond the valve body 122 such that the adjusting rod 200 can be moved in axial directions 178 and 186 thereby moving the plunger guide 182 connected thereto in axial directions 178 and 186 within the rotor chamber 136 of the valve body 122. The adjusting movement of the plunger guide 182 in axial directions 178 and 186 alters or controllingly changes the distance or spacing between the plunger guide 182 and the end 156 of the rotor 124, thereby changing or adjusting the travel of the plungers 166 and controlling the measured amount of power fluid bypassed or discharged through the control discharge valve 10b.

A retaining flange 208 is secured on one end thereof to the valve body 122 via one of the fasteners 142, an opening 210 being formed through the opposite end of the retaining flange 208. In an assembled position of the control discharge valve 10b, a portion of the adjusting rod 200 extending beyond the cover plate 140 extends through the opening 210 formed in the retaining flange 208. Thus, the adjusting nut 206 is disposed between the valve body 122 and the retaining flange 208, the cover plate 140 engaging the adjusting nut 206 and retaining the movement of the adjusting rod 200 in an axial direction 178 and the retaining flange 208 engaging the adjusting nut 206 limiting the movement of the adjusting rod 200 in an axial direction 186, thereby maintaining a predetermined, adjustable setting of the plunger guide 182. Further, by turning the adjusting nut 206, the adjusting rod 200 is moved in axial directions 178 and 186, depending upon the direction in which the adjusting nut 206 is turned thereby adjusting the position of the plunger guide 182 in the rotor chamber 136 of the valve body 122.

During the operation of the control discharge valve 10b and assuming power fluid enters via the shaft opening 160 of the rotor shaft 126 and is discharged via the fluid opening 146 in the valve body 122, the power fluid passes through the transverse shaft openings 162 into the fluid passageway 152 formed in the valve body 122. The power fluid within the fluid passageway 152 is sequentially moved into each rotor opening 164 as the rotor opening 164 is rotated to aligned positions with respect to the fluid passageway 152 in bypass positions of the rotor 124, in a manner similar to that described before with respect to the control discharge valves 10 and 10a. As the power fluid passes into the rotor openings 164, the plunger 166 disposed therein is biased via the power fluid in a direction 186 as the power fluid fills a portion of the rotor opening 164 aligned with the fluid passageway 152. More particularly, each plunger 166 is biased in a direction 186 via the power fluid entering the rotor opening 164 an amount or a distance related to the biasing force applied via the plunger spring 196 and the position of the plunger guide 182.

Thus, each of the rotor openings 164 is filled with a predetermined amount of power fluid from the fluid passageway 152 in bypass positions of the rotor 124 and, as the rotor 124 is rotated to position the rotor openings 164 in aligned bypass positions with respect to the fluid opening 146 in the valve body 122, the fluid previously moved into the rotor openings 164 from the fluid passageway 152 in then forced from the rotor openings 164 and discharged via the fluid opening 146 in the valve body 122, the plungers 166 forcing the power fluid from the rotor openings 164 via the biasing force applied to the plungers 166 via the plunger springs 196.

TRANSMISSION CAVITY

As mentioned before, a hydraulic transmission system constructed and operating in accordance with the present invention also utilizes an improved transmission cavity, in one preferred operational embodiment. Shown in FIGS. 6, 7 and 8 is one embodiment of a transmission cavity 220 constructed in accordance with the present invention.

The transmission cavity 220 includes a housing 222 having a first housing section 224 and a second housing section 226. The first and the second housing sections 224 and 226 are each cylindrically shaped, in a preferred form, the first housing section 224 having opposite end faces 228 and 230 and an outer periphery 232 and the second housing section 226 having opposite end faces 234 and 236 and an outer periphery 238. The end faces 230 and 236 of the first and the second housing sections 224 and 226 matingly abut in an assembled position, and the first and the second housing sections 224 and 226 are secured in this assembled position forming the housing 222 via a plurality of fastener elements 240 (two of the fastener elements 240 being shown in FIG. 6). The fastener elements 240, more particlarly, each extend through aligned openings 242 and 244 formed through the first and the second housing sections 224 and 226, respectively (shown more clearly in FIGS. 7 and 8).

As shown more clearly in FIGS. 6 and 7, the first housing section 224 includes a circularly shaped first gear recess 246 and a first shaft recess 248 formed in the end face 230, the first shaft recess 248 being disposed within a central portion of the first gear recess 246 and, more particularly, formed in the recessed portion formed via the first gear recess 246. A circularly shaped second gear recess 250 and a second shaft recess 252 are each formed in the end face 220 of the first housing section 224, the second shaft recess 252 being disposed within a central portion of the second gear recess 250 and, more particularly, formed in the recessed portion formed via the second gear recess 250.

The first gear recess 246 is spaced a distance from the second gear recess 250 and a drive gear recess 254 is formed in the end face 230 of the first housing section 224 disposed generally between the first and the second gear recesses 246 and 250. A portion of the drive gear recess 254 intersects a portion of the first gear recess 246 and another portion of the drive gear recess 254 intersects a portion of the second gear recess 250. A shaft opening 256 is formed through the first housing section 224, the shaft opening 256 extending through the first housing section 224 intersecting and extending through a central portion of the drive gear recess 254.

The first gear recess 246 is sized to receive a first gear 258 and a first gear shaft 260 is secured to and extends through a central portion of the first gear 258, a portion of the first gear shaft 260 being journally disposed and supported within the first shaft recess 248. The second gear recess 250 is sized to receive a second gear 262 and a second gear shaft 264 is secured to and extends through a central portion of the second gear 262, a portion of the second gear shaft 264 being journally disposed and supported within the second shaft recess 252. The drive gear recess 254 is sized to receive a drive gear 268 and a portion of a drive gear shaft 270 secured to and extending through a central portion of the drive gear 268, a portion of the drive gear shaft 270 extending through and being journally disposed and supported within the shaft opening 256.

The drive gear 268 is thus journally supported within the first housing section 224 and disposed generally between the first and the second gears 258 and 262. The drive gear 268 and the first and the second gears 258 and 262 are each rotatingly supported in the respective recesses 254, 246 and 250, and the drive gear 268 and the first and the second gears 258 and 262 are each sized and positioned such that the drive gear 268 is in meshing engagement with a portion of each of the first and the second gears 258 and 262 during the operation of the transmission cavity 220. The intersecting portions of the first and the second gear recesses 246 and 250 with the drive gear recess 254 are shaped and positioned to accommodate the meshingly engaged portions of the first and the second gears 258 and 262 with the drive gear 268.

A first port 272 is formed through the first housing section 224 intersecting portions of the drive gear recess 254 and the first gear recess 246 or, more particularly, intersecting a portion of the recessed portion in the first housing section 224 generally between the drive gear recess 254 and the first gear recess 246. A second port 274 is formed through the first housing section 224 intersecting portions of the drive gear recess 254 and the second gear recess 250 or, more particularly, intersecting a portion of the recessed portion formed in the first housing section 224 generally between the drive gear recess 254 and the second gear recess 250.

A first shaft recess 276 is formed in the end face 236 of the second housing section 226, the first shaft recess 276 being sized and positioned to receive and journally support a portion of the first gear shaft 260. Thus, in an assembled position of the first and the second housing sections 224 and 226, the first gear 258 is rotatingly supported within the first gear recess 246 via the first gear shaft 260 having one end portion journally supported in the first shaft recess 248 in the first housing section 224 and one other end portion journally supported in the first shaft recess 276 formed in the second housing section 226.

A second shaft recess 278 is also formed in the end face 236 of the second housing section 224, the second shaft recess 278 being sized and positioned to receive and journally support a portion of the second gear shaft 264. Thus, in an assembled position of the first and the second housing sections 224 and 226, the second gear 262 is rotatingly supported within the second gear recess 250 via the second gear shaft 264 having one end portion journally supported in the second shaft recess 252 in the first housing section 224 and one other end portion journally supported in the second shaft recess 278 formed in the second housing section 226.

A fluid recess 280 is formed in the end face 236 of the second housing section 226, having portions extending generally in radially opposite directions from a shaft recess 282 formed in the central portion of the end face 236. In an assembled position of the housing 222, one end portion 284 of the drive gear shaft 270 is disposed and journally supported within the shaft recess 282 formed in the second housing section 226, one other portion of the drive gear shaft 270 extending through and being journally supported within the shaft opening 256, as mentioned before.

A shaft 286 is connected to the second housing section 226 via a shaft flange 288 secured to the shaft 286 and having portions extending radially from the shaft 286. More particularly, the second shaft 286 is secured to the second housing section 226 via a plurality of bolt type fastener elements 290 (two of the fastener elements 290 being shown in FIG. 6), each of the fastener elements extending through openings 292 formed a distance through the end face 234 of the second housing section 226.

The fluid recess 280 also includes a circularly shaped portion 294 forming an annular recess extending about the shaft recess 282 formed in the second housing section 226. The circularly shaped portion 294 is, more particularly, positioned to extend annularly about an adjacent portion of the drive gear shaft 270 in an assembled position of the transmission cavity 220. The fluid recess 280, including the circularly shaped portion 294 thereof form a fluid passageway 296 in the housing 222 disposed and positioned to be in fluidic communication with a portion of the drive gear shaft 270, for reasons to be made more apparent below.

The drive gear shaft 270 includes a shaft opening 298 extending a distance axially through a central portion of the drive gear shaft 270 and a plurality of transverse shaft openings 300 (three of the transverse shaft openings 300 being shown in FIG. 6), each of the transverse shaft openings 300 being formed transversely through the drive gear shaft 270 intersecting a portion of the shaft opening 298 formed therein. The drive gear shaft 270 is supported in the transmission cavity housing 222 such that the transverse shaft openings 300 are disposed generally within the fluid passageway 296 thereby providing fluidic communication between the shaft opening 298 and the fluid passageway 296 via the transverse shaft openings 300.

A shaft opening 302 is formed through a portion of the shaft 286. A first fluid opening 304 is formed through the outer periphery of the shaft flange 288, the first fluid opening 304 extending radially through the shaft flange 288 and intersecting the shaft opening 302 thereby providing fluidic communication therebetween. A second fluid opening 306 is formed through the outer periphery of the shaft flange 288 and extends a distance radially therethrough intersecting a portion of the shaft opening 302 of the shaft 286, thereby providing fluidic communication between the shaft opening 302 and the second fluid opening 306, for reasons to be made more apparent below.

A first fluid conduit 308 is connected on one end thereof to the first port 272 formed in the housing 222, the opposite end of the fluid conduit 308 being disposed within and connected to the first fluid opening 304 formed in the shaft flange 288 thereby providing fluidic communication between the shaft opening 298 in the drive gear shaft 270 and the shaft opening 302 of the shaft 286 via the fluid passageway 296, the meshingly engaged portions between the first gear 258 and the drive gear 268, the first port 272, the fluid conduit 308 and the first fluid opening 304. A second fluid conduit 310 is connected on one end thereof to the second port 274 formed in the housing 222, the opposite end of the fluid conduit 310 being disposed within and connected to the second fluid opening 306 thereby providing fluidic communication between the shaft opening 298 of the drive gear shaft 270 and the shaft opening 302 of the shaft 286 via the fluid passageway 296, the meshingly engaged portions between the second gear 262 and the drive gear 268, the second port 274, the second fluid conduit 310, and the second fluid opening 306, for reasons to be made more apparent below.

In the operation of the transmission cavity 220, the shaft 286 is connected to and rotated via a prime mover (not shown) such as an electric motor, steam turbine or the like, for example, thereby rotating the housing 222 in a rotational direction 312 (shown in FIG. 7). The drive gear shaft 270 is connected to a load or constitutes a portion of the output shaft of a transmission system, as will be described in greater detail below with respect to FIGS. 9 and 10.

The drive gear shaft 270 is constructed to receive power fluid via the shaft opening 298, the received power fluid filling the fluid passageway 296 via the transverse shaft openings 300. The power fluid is moved from the fluid passageway 296 into and through the shaft opening 302 of the shaft 286 via the meshing engagement between the first and the second gears 258 and 262 and the drive gear 268 functions in the nature of gear type fluid or hydraulic pumps, the first and the second gears 258 and 262 being rotatingly driven about the outer periphery of the drive gear 268 via the rotation of the shaft 286 and the power fluid moving from the fluid passageway 296, the first and the second ports 272 and 274, the first and the second fluid conduits 308 and 310 and the first and the second fluid openings 304 and 306.

In a preferred operational embodiment of the transmission cavity 220, the shaft opening 302 of the shaft 286 is connected in fluidic communication with the fluid inlet of a control discharge valve of the type shown in FIGS. 1 through 5, described before, the control discharge valve bypassing a measured amount of power fluid through the transmission cavity 220. Assuming a volumetric amount of power fluid substantially equal to or greater than the power fluid capacity of the transmission cavity 220 when the output shaft 270 is stationary (non-rotating) is bypassed therethrough, the transmission cavity 220 functions in the nature of a pump and virtually no torque will be applied at the output shaft 270 of the transmission cavity 220. If the volumetric amount of power fluid passing through the transmission cavity 220 and discharging through the opening 302 in the shaft 286 decreases as the volumetric amount of power fluid tending to enter or available for entering the transmission cavity 220 via the shaft opening 298 of the output shaft 270 increases, the output shaft 270 tends to rotate via the drive gear 268 at a rotational speed required to maintain the quantity or volumetric amount of the power fluid entering the transmission cavity 220 substantially the same as the volumetric amount of the power fluid leaving the transmission cavity 220 via the shaft opening 302 of the shaft 286. When the output shaft 270 of the transmission cavity 220 is rotating at a rotational speed substantially the same as the rotational speed of the housing 222 or, in other words, substantially the same as the rotational speed of the shaft 286, there will be no pumping action effected via the first and the second gears 258 and 262 meshingly engaging the drive gear 268. The transmission cavity 220 is constructed to cooperate with a control discharge valve in a hydraulic transmission system for applying a periodic impulse type of increased torque at the output shaft 270, in a manner to be made more apparent below with respect to the hydraulic transmission system of FIG. 10. It should be noted that the foregoing is intended to explain the rationale underlying the operation of the transmission cavity 220 and relative flows are utilized, the actual flow of fluid entering the transmission cavity 220 being of course equal to the actual flow of fluid leaving the transmission cavity 220.

Hydraulic Transmission System of FIG. 9

As generally described before, the control discharge valves 10, 10a and 10b and the transmission cavity 220 are each constructed to be utilized in the improved hydraulic transmission system of the present invention, one embodiment of a hydraulic transmission system constructed in accordance with the present invention being diagrammatically shown in FIG. 9 and designated therein via the general reference numeral 314. The hydraulic transmission system 314 includes a prime mover 316 drivingly connected to a transmission system input shaft 318 for drivingly rotating the transmission system input shaft 318 in a driven position of the prime mover 316, the prime mover 316 being an electric motor, a steam turbine, a diesel engine or other such prime mover constructed to drivingly rotate a shaft connected thereto. A flywheel 320, a coupler 322 and a fluid pump 324 are each connected to and supported on a portion of the transmission system input shaft 318.

A control discharge valve is connected to and interposed in the transmission system input shaft 318, the control discharge valve being constructed to bypass a measured, controlled, predetermined amount of power fluid therethrough in discharge positions thereof. The control discharge valve is, more particularly, one of the control discharge valves 10, 10a and 10b, described in detail before, as indicated in FIG. 9. The flywheel 320 is interposed between the control discharge valve and the prime mover 316 and the coupler 322 is interposed between the fluid pump 324 and the control discharge valve 320, in the operational embodiment of the hydraulic transmission system 314 shown in FIG. 9.

Assuming, for example, that the control discharge valve 10, as shown in FIGS. 1, 2 and 3, is utilized in the hydraulic transmission system 314, the rotor shaft 62 is coupled to the flywheel 320 and forms a portion of the transmission system input shaft 318 and the rotor shaft 60 is connected to the fluid pump 324 via the coupler 322, the rotor shaft 60 also forming a portion of the transmission system input shaft 318, in this embodiment of the hydraulic transmission system of the present invention utilizing the control discharge valve 10. The control discharge valves 10a and 10b, shown in FIGS. 4 and 5 and described in detail before, are also constructed to be utilized in the hydraulic transmission system 314, the control discharge valves 10a and 10b being connected to and having portions forming a portion of the transmission system input shaft 318 in a manner similar to that described before with respect to the control discharge valve 10.

The fluid pump 324 is constructed to receive power fluid from a power fluid reservoir 326 via a conduit 328, the fluid pump 324 pumping the received power fluid at an elevated pressure potential through a conduit 330 connected to the fluid pump discharge 324, in a manner well-known in the art. The power fluid pumped from the fluid pump 324 is, more particularly, connected to the fluid inlet of a fluid motor 332 via the fluid conduit 330. The fluid motor 332 is constructed to receive power fluid at an elevated pressure potential from the fluid pump 324 and to drivingly rotate a transmission system output shaft 334 connected thereto (a portion of the transmission system output shaft 334 being shown in FIG. 9 connected to the fluid motor 332). It should be noted that the load placed on the pressure potential from the pump 324 does depend to some degree on the load placed on the output shaft 334.

A control valve 336 is interposed in the fluid conduit 328 between the fluid pump 324 and the power fluid reservoir 326 for controlling the flow of power fluid from the power fluid reservoir 326 to the fluid pump 324 during the operation of the hydraulic transmission system 314. A conduit 340 is connected to the fluid motor 332 discharge opening connecting the fluid motor 332 discharge opening to the power fluid reservoir 326, as schematically shown in FIG. 9.

Thus, if the prime mover 316 were directly connected to the first fluid pump 324, the fluid pump 324 would be rotatingly driven via the prime mover 316 pumping power fluid from the reservoir 326 to the fluid motor 332, the fluid motor 332 rotatingly driving the transmission system output shaft 334 in response to the received power fluid and discharging the received power fluid to the fluid reservoir 326 via the conduit 340. In this manner, the output torque and rotational speed of the transmission system output shaft 334 is directly controlled via the fluid motor 332 size and, more particularly from an operational viewpoint, controlled via the volumetric amount of power fluid and the pressure level of the power fluid pumped from the fluid pump 324 and connected to the fluid motor 332, the volumetric amount of power fluid being controlled via the control valve 336, in this assumed example. However, the control discharge valve 10, 10a or 10b is hydraulically interposed between the fluid pump 324 and the fluid motor 332 and, more particularly, a conduit 342 is connected to the conduit 330 generally between the fluid pump 324 and the fluid motor 332, the conduit 342 being connected to the inlet of the control discharge valve 320.

As described before with respect to the embodiments of the control discharge valve 10, 10a and 10b, the control discharge valve is constructed to bypass a predetermined, controlled amount of power fluid therethrough in bypass positions thereof and thus the control discharge valve will bypass a predetermined, controlled amount of the power fluid connected to the fluid motor 332 from the fluid pump 324 at each bypass position of the control discharge valve. Thus, in bypass positions of the control discharge valve, the fluid motor 332 receives a volumetric amount of power fluid from the fluid pump 324 less than the volumetric amount of power fluid received from the fluid pump 324 in closed or nonbypass positions of the control discharge valve, the measured amount of power fluid bypassed via the control discharge valve in bypass positions thereof being determined and controlled in a manner described in detail before with respect to the control discharge valves 10, 10a and 10b.

Since the fluid motor 332 receives less power fluid from the fluid pump 324 as a result of the control discharge valve bypassing a measured amount of the power fluid in bypass positions thereof, the fluid motor 332 applies less torque at the transmission system output shaft 334 in the bypass positions of the control discharge valve. Also, since a measured amount of the power fluid from the fluid pump 324 is bypassed via the control discharge valve in bypass positions thereof, a reduced amount of power or energy is required at the transmission system input shaft 318 to drive the fluid pump 324 in bypass positions of the control discharge valve. The reduced energy required to drive the fluid pump 324 in bypass positions of the control discharge valve results in an energy which is stored in the flywheel 320 connected to the transmission system input shaft 318 in bypass positions of the control discharge valve 320.

When the control discharge valve is subsequently positioned in closed positions wherein a measured amount of power fluid is not bypassed through the control discharge valve, the energy stored in the flywheel 320 is released and applied to the transmission system input shaft 318, thereby increasing the driving power applied at the first pump 324 via the transmission system input shaft 318. The stored energy released via the flywheel 320 in closed positions of the control discharge valve thus results in an increased energy being imparted to the power fluid connected to the fluid motor 332 via the conduit 330 resulting in an increase in the torque applied at the transmission system output shaft 334 via the fluid motor 332. Thus, the hydraulic transmission system 314 is constructed such that a reduced amount of torque is applied at the transmission system output shaft 334 in bypass positions of the control discharge valve 320 and periodic impulses of increased torque are applied at the transmission system output shaft 334 in closed positions of the control discharge valve.

For reasons described before with respect to the control discharge valves 10, 10a and 10b, the control discharge valve is constructed, in one preferred form, to bypass a measured amount of power fluid therethrough at more than one bypass position during the rotation of the transmission system input shaft 318 through one revolution of 360°. Assuming the control discharge valve 10, shown in FIGS. 1, 2 and 3, is utilized in the hydraulic transmission system 314, the control discharge valve is positioned in a bypass position each time the transmission system input shaft 318 is rotated through an incremental degree of rotation equal to the arcuate distance or spacing 68 between the rotor openings 66, the arcuate spacing 68 between the rotor openings 66 controlling the bypass and the closed positions of the control discharge valve 10. Thus, in one preferred operational embodiment, a substantially increased impulse torque is applied at the transmission system output shaft 334, the torque amplitude being controlled via the volumetric amount of power fluid bypassed through the control discharge valve at each bypass position thereof and via the stored energy released via the flywheel 320. The duration of each impulse of increased torque applied to the transmission system output shaft 334 is controlled substantially via the time during which the control discharge valve remains in closed and bypass positions, and the rotational speed of the transmission system input shaft 318 which is connected to and controls the rotational speed of the rotor of the control discharge valve.

As mentioned before with respect to the control discharge valves 10, 10a and 10b, the fluid openings and the shaft opening of each of the control discharge valves 10, 10a and 10b can be connected and utilized as either power fluid inlets or power fluid outlets in particular operational embodiments utilizing the control discharge valves 10, 10a and 10b. Assuming the control discharge valve 10, shown in FIGS. 1, 2 and 3, is utilized for the control discharge valve of the hydraulic transmission system 314 and further assuming that the power fluid being pumped from the fluid pump 324 is connected to the fluid openings 38 and 40 via the conduit 342, the shaft opening 78 through the rotor shaft 60 of the control discharge valve 10 will function in the nature of a power fluid discharge. More particularly referring to the operational embodiment of the hydraulic transmission system 314, schematically shown in FIG. 9, the rotor shaft 60 forms a portion of the transmission system input shaft 318 and is connected or coupled to the fluid pump 324 drivingly rotating the fluid pump 324 in a driven position of the prime mover 316.

In this operational embodiment of a hydraulic transmission system 314 utilizing the control discharge valve 10, the shaft opening 78 forms a portion of a shaft opening 344 formed through a portion of the transmission system input shaft 318 connected between the control discharge valve and the fluid pump 324. In this embodiment, a plurality of transverse shaft openings 346 (shown in FIG. 9) are formed transversely through a portion of the transmission system input shaft 318 intersecting a portion of the shaft opening 344 through a portion thereof.

The coupler 322, more particularly, includes a coupler housing 348 having a fluid chamber 350 formed within a central portion thereof. An outlet nipple 352 is disposed through an opening in the coupler housing 348 and secured therein to a portion of the coupler housing 348, the end of the outlet nipple 352 extending from the coupler housing 348 being connected to a conduit 354. The conduit 354 is connected to the power fluid reservoir 326 and thus the fluid chamber 350 is in fluidic communication with the power fluid reservoir 326 via the outlet nipple 352 and the conduit 354, a control valve 356 being interposed in the conduit 354.

The coupler 322 is positioned on the transmission system input shaft 318 such that the fluid chamber 350 of the coupler 322 is disposed about and encompasses the transverse shaft openings 346 formed through a portion of the transmission input shaft 318. Thus, the measured amounts of power fluid discharged via the control discharge valve in bypass positions thereof passes through the shaft opening 344 and is discharged into the fluid chamber 350 of the coupler 322, the power fluid bypassed via the control discharge valve being then connected to the power fluid reservoir 326 via the conduit 354. By the same token, and assuming the embodiment of the control discharge valve 10 is utilized for the control discharge valve in the hydraulic transmission system 314, if the shaft opening 78 of the rotor shaft 60 of the control discharge valve 10 (shown in FIG. 1) were connected to and utilized as the power fluid inlet of the control discharge valve and the fluid openings 38 and 40 were each connected to and utilized as the power fluid outlets or discharge openings of the control discharge valve, the nipple 352 of the coupler 322 would be connected to the conduit 330 generally between the fluid pump 324 and the fluid motor 332 and another conduit (not shown) would be connected to the control discharge valve connecting the control discharge valve to the power fluid reservoir 326 or, more particularly, connecting the fluid openings 38 and 40 of the control discharge valve 10 to the power fluid reservoir 326.

Figure 10:
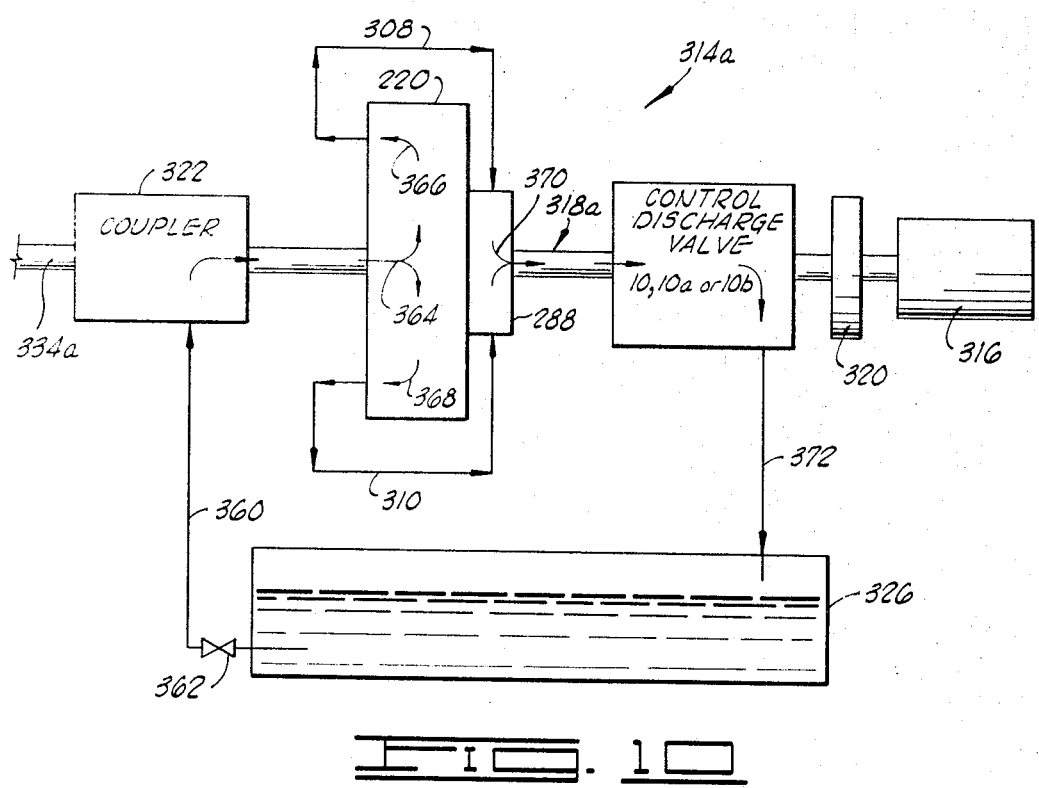
FIG. 10 is a schematic, diagrammatic view, similar to FIG. 9, but showing a modified hydraulic transmission system utilizing the control discharge valve and the transmission cavity.

Hydraulic Transmission System of FIG. 10

Shown schematically and diagrammatically in FIG. 10 is one other operational embodiment of a hydraulic transmission system constructed in accordance with the present invention and operating to produce impulses of increased torque at the transmission system output shaft in a manner similar to that described before with respect to the hydraulic transmission system 314, the hydraulic transmission system being generally designated as 314a in FIG. 10. The modified hydraulic transmission system 314a includes the prime mover 316 drivingly connected to a modified transmission system input shaft 318a, the flywheel 320 connected to the transmission system input shaft 318a and functioning to store and release energy in a manner similar to that described before with respect to the flywheel 320 of FIG. 9, the control discharge valve having a constructional embodiment similar to the control discharge valves 10, 10a and 10b, described in detail before, and the coupler 322, the salient difference between the hydraulic transmission system 314a and the hydraulic transmission system 314 being that the modified hydraulic transmission system 314a incorporates and utilizes the transmission cavity 220 (the construction and operation of the transmission cavity 220 being described before with respect to FIGS. 6, 7 and 8).

The transmission cavity 220 is connected to the transmission system input shaft 318a and, more particularly, the shaft 286 having the shaft opening 302 formed through a portion thereof (shown in FIG. 6) is connected to the control discharge valve via the transmission system input shaft 318a extending between the transmission cavity 220 and the control discharge valve, and the drive gear shaft 270 of the transmission cavity 220 (shown in FIG. 6) is connected to the coupler 322 and forms a portion of the transmission system input shaft 318a connected between the transmission cavity 220 and the coupler 322. In operation, the hydraulic transmission system 314a will function in a manner similar to that described before with respect to the hydraulic transmission system 314 (shown in FIG. 9), the salient difference being that the transmission cavity 220 is positioned within the hydraulic transmission system 314a and cooperates therein replacing the functions provided via the fluid pump 324 and the fluid motor 332 of the hydraulic transmission system 314 (shown in FIG. 9) in a manner to be made more apparent below.

Since the shaft 286 of the transmission cavity 220 forms an integral portion of the transmission system input shaft 318a, the transmission cavity 220 including the housing 222 thereof is rotated via the prime mover 316 and the coupling interconnection between the prime mover 316 and the transmission cavity 220 provided via a portion of the transmission system input shaft 318a extending and connected therebetween, thereby rotatingly driving the first and the second gears 258 and 262 of the transmission cavity 220 about the drive gear 268.

In the operational embodiment of the modified hydraulic transmission system 314a, shown in FIG. 10, the coupler 322 is connected to the power fluid reservoir 326 via a conduit 360, a control valve 362 being interposed in the conduit 360 between the coupler 322 and the power fluid reservoir 326. More particularly, the conduit 360 is connected to the outlet nipple 352 of the coupler housing 348 thereby providing fluidic communication between the power fluid in the power fluid reservoir 326 and the fluid chamber 350 of the coupler 322 (the details of construction of the coupler 322 not being shown in FIG. 10 since the coupler 322 in FIG. 10 is constructed identical to the coupler 322 shown in FIG. 9 and described in detail before).

The drive gear shaft 270 of the transmission cavity 220 (shown in FIG. 6) extends through the coupler 322 and the shaft opening 298 terminates in a central portion of the fluid chamber 350 of the coupler 322, a plurality of transverse openings being formed through the drive gear shaft 270 and disposed within the fluid chamber 350 of the coupler 322, in a manner similar to that described before with respect to the coupler 322, the transverse openings 346 and the opening 344 through the portion of the transmission system input shaft 318 of FIG. 9. Thus, the coupler 322 is positioned on the transmission system input shaft 318a to provide fluidic communication between the power fluid reservoir 326 and the fluid passageway 296 formed in the transmission cavity 220 via the conduit 360, the fluid chamber 350 formed in the coupler 322, the transverse openings (not shown) formed through a portion of the transmission system input shaft 318a disposed within the fluid chamber 350 of the coupler 322, the shaft opening 298 and transverse openings 300 formed through the drive gear shaft 270 of the transmission cavity 220 (shown in FIG. 6), the drive gear shaft 270 and shaft opening 298 therethrough forming the portion of the transmission system input shaft 318a extending between the transmission cavity 220 and the coupler 322, as shown in FIG. 10.

As schematically shown in FIG. 10, the power fluid from the power fluid reservoir 326 enters the transmission cavity 220 and passes through the transverse shaft openings 300 filling the fluid passageway 296, as schematically indicated in FIG. 10 via the directional arrows 364. As the housing 222 of the transmission cavity 220 is rotated via the rotation of the transmission system input shaft 318a, the power fluid is moved within the fluid passageway 296 such that a portion of the power fluid passes between the meshingly engaging portions of the first gear 258 and the drive gear 268 and is discharged via the first port 272 in the housing 222, as schematically indicated via the directional arrow 366 in FIG. 10. Another portion of the power fluid from the coupler 322 enters the fluid passageway 296 and is discharged between the second gear 262 and the drive gear 268 via the second port 274 formed in the housing 222 of the transmission cavity 220, as generally indicated via the directional arrow 368 in FIG. 10. The power fluid discharged between the meshingly engaged portions of the first and the second gears 258 and 262 and the drive gear 268 of the transmission cavity 220 is coupled or connected to the shaft opening 302 of the shaft 286 via the conduits 308 and 310, respectively, the power fluid discharge therethrough being diagrammatically or schematically indicated in FIG. 10 via the directional arrow 370. The shaft 286 forms a portion of the transmission system inlet shaft 318a extending between the transmission cavity 220 and the control discharge valve.

Assuming the control discharge valve 10, shown in FIGS. 1, 2 and 3 and described in detail before, is utilized for the control discharge valve of the hydraulic transmission system 314a of FIG. 10, the rotor shaft 60 of the control discharge valve 10 is connected to the shaft 286 of the transmission cavity 220 such that the openings 302 and 78 through the shafts 286 and 60, respectively, are aligned and in fluidic communication. The power fluid is discharged from the transmission cavity 220 through the shaft openings 302 and 78, in this operational embodiment of the control discharge valve 10, wherein the control discharge valve 10 is utilized. A predetermined, measured amount of the power fluid from the transmission cavity 220 is thus connected to and discharged through the control discharge valve in measured, predetermined amounts in bypass positions of the control discharge valve, the fluid openings 38 and 40 of the embodiment of the control discharge valve 10 shown in FIGS. 1, 2 and 3, being connected to the power fluid reservoir 326 via a conduit 372, as shown in FIG. 10.

Thus, in the bypass positions of the control discharge valve of the hydraulic transmission system 314a, power fluid is passed through the transmission cavity 220 in measured amounts at predetermined intervals of time resulting in an energy stored in the flywheel 320. By the same token, in closed positions of the control discharge valve, the transmission cavity 220 imparts a rotational force at the drive gear shaft 270 or, in other words, the hydraulic system output shaft 334a, the imparted force being augmented via the energy released via the flywheel 320 resulting in impulses of torque having an increased torque amplitude applied at the transmission system output shaft 334a.

The hydraulic transmission systems 314 and 314a thus each rotate the transmission system output shafts 334 and 334a, respectively, at controlled rotational speeds between zero and the rotational speed of the transmission system input shaft 318 and 318a, respectively, while multiplying the torque at the transmission system output shafts 334 and 334a at predetermined ratios of the rotational speed of the transmission system input shaft 318 or 318a divided by the rotational speed of the transmission system output shaft 334 and 334a greater than one. In the hydraulic transmission system 314, the control discharge valve is directly connected to the transmission system input shaft 318 and the fluid pump 324 is also connected to the transmission system input shaft 318, the power fluid from the fluid pump 324 being connected to the hydraulic motor 332 and the control discharge valve. Any power fluid which is not passed through the control discharge valve is forced through the fluid motor 332 causing the transmission system output shaft 334 to be rotated at a speed substantially inversely proportional to the amount of power fluid bypassed through the control discharge valve. Thus, by varying the volumetric amount of power fluid passed via the control discharge valve, the rotational speed of the transmission system output shaft 334 is varied.

In lieu of the fluid pump 324 and the fluid motor 332, the transmission cavity 220 can be utilized such as described before with respect to the hydraulic transmission system 314a. In this embodiment of the present invention, the transmission cavity 220 in essence or functionally combines the operations previously performed via the fluid pump 324 and the fluid motor 332.

In both hydraulic transmission systems 314 and 314a, the control discharge valves function to bypass the power fluid in impulses and the increased torque at the transmission system output shafts 334 and 334a occurs as a result of the energy stored in the flywheels 320 in bypass positions of the control discharge valve, the stored energy being released during each power pulse in non-bypass or closed positions of the control discharge valve. Thus, the torque at the transmission system output shaft 318 and 318a is substantially increased but is of a shorter duration thereby conserving the power input of the hydraulic transmission system. The total duration of the output torque pulses applied at the transmission system output shafts 334 and 334a summed over one revolution of the transmission system input shafts 318 and 318a will be less than one based on a rotational speed of the transmission system input shaft 318 and 318a of one.

Changes may be made in the construction and the operation of the various components, systems, assemblies and elements disclosed herein without departing from the spirit and the scope of the invention as defined in the following claims.

What is claimed is:

1. A hydraulic transmission system, comprising:
    a transmission system output shaft;
    means connected to the transmission system output shaft rotatingly driving the transmission system output shaft;
    means connected to the means rotatingly driving the transmission system output shaft having a portion retaining a predetermined amount of power fluid and a portion supplying power fluid to the means rotatingly driving the transmission system output shaft, the means rotatingly driving the transmission system output shaft receiving the power fluid and rotatingly driving the transmission system output shaft in response to the received power fluid;
    a control discharge valve connected to the means rotatingly driving the transmission system output shaft, having bypass positions and closed positions, a portion of the control discharge valve receiving and bypassing therethrough a predetermined portion of the power fluid supplied to the means rotatingly driving the transmission system output shaft in bypass positions thereof;
    a prime mover connected to the control discharge valve positioning the control discharge valve in bypass positions and closed positions at predetermined intervals of time; and
    means connected to the means rotatingly driving the transmission system output shaft storing energy in bypass positions of the control discharge valve and releasing the stored energy in closed positions of the control discharge valve, the released energy being connected to the means rotatingly driving the transmission system output shaft resulting in a torque of increased torque amplitude being applied at the transmission system output shaft in impulses in closed positions of the control discharge valve.

2. The apparatus of claim 1 wherein the means rotatingly driving the transmission system output shaft includes: a fluid motor having a portion receiving power fluid and a portion connected to the transmission system output shaft, the fluid motor drivingly rotating the transmission system output shaft in response to the power fluid received thereby; and wherein the means supplying power fluid to the means rotatingly driving the transmission system output shaft includes: a power fluid reservoir; a fluid pump connected to the power fluid reservoir and to the fluid motor, the fluid pump pumping power fluid to the fluid motor in a driven position of the fluid pump; and a control valve interposed between the fluid pump and the power fluid reservoir controlling the volumetric amount of power fluid supplied via the fluid pump thereby controlling the rotational speed imparted to the transmission system output sahft; and wherein the control discharge valve is defined further as being interposed between the fluid pump and the fluid motor bypassing predetermined amounts of the power fluid supplied via the fluid pump in bypass positions of the control discharge valve.

3. The apparatus of claim 2 defined further to include: a transmission system input shaft, the prime mover being connected to a portion of the transmission system input shaft and rotatingly driving the transmission system input shaft in a driven position of the prime mover; and wherein a portion of the control discharge valve is connected to the transmission system input shaft, the rotation of the transmission system input shaft positioning the control discharge valve in bypass and closed positions; and wherein the fluid pump is connected to and driven by the transmission system input shaft; and wherein the means storing energy in bypass positions of the control discharge valve is defined further as being a flywheel connected to the transmission system input shaft between the prime mover and the fluid pump, the flywheel imparting the stored energy to drive the transmission system input shaft in closed positions of the control discharge valve.

4. The apparatus of claim 1 wherein the means rotatingly driving the transmission system output shaft and the means supplying power fluid thereto are each defined further to include: a transmission system input shaft, the prime mover being connected to and rotatingly driving the transmission system input shaft; and a transmission cavity comprising:

- a housing connected to and rotatingly driven via the transmission system input shaft, having a fluid passageway formed in a portion thereof and a gear means rotatingly supported in a portion of the housing, the rotation of the housing rotating the gear means about the transmission system input shaft;
- a drive gear connected to and driving the transmission system output shaft in a driven position of the drive gear, portions of the drive gear meshingly engaging a portion of the gear means and the meshingly engaged portions of the gear means and the drive gear means fluidically communicating with the fluid passageway, the gear means being rotatingly driven about the drive gear means via the rotation of the housing; and
- a power fluid reservoir connected to and supplying fluid to the fluid passageway in the housing of the transmission cavity; and wherein the control discharge valve is defined further as being connected to the transmission cavity fluidically communicating with the fluid passageway and bypassing predetermined amounts of power fluid from the fluid passageway through the meshingly engaged portions of the gear means and the drive gear means in bypass positions of the control discharge valve.

5. The apparatus of claim 4 wherein the means storing energy in bypass positions of the control discharge valve is defined further as being a flywheel connected to the transmission system input shaft between the prime mover and the transmission cavity, the flywheel imparting the stored energy to drive the transmission system input shaft in closed positions of the control discharge valve.

6. The apparatus of claim 1 wherein the control discharge valve is defined further to include:

- a housing having opposite ends, a rotor chamber formed in a portion thereof, a fluid passageway formed in a portion thereof intersecting a portion of the rotor chamber and a fluid opening formed through a portion thereof intersecting a portion of the rotor chamber; and
- a rotor rotatingly supported within a portion of the rotor chamber of the housing, having opposite ends and at least one rotor opening formed axially therethrough intersecting the opposite ends thereof, the rotor being rotatably movable to bypass positions aligning at least one of the rotor openings sequentially with the fluid passageway and the fluid opening in the housing, the aligned rotor opening receiving power fluid from one of the fluid passageway and the fluid opening and subsequently discharging the received power fluid from the other one of the fluid passageway and the fluid opening in the housing when aligned therewith.

7. The apparatus of claim 6 wherein the rotor includes a plurality of rotor openings spaced circumferentially about the rotor; and wherein the rotor chamber forms a pair of opposed walls in the housing and the fluid passageway and the fluid opening are each formed in one of the opposed walls and another fluid passageway and another fluid opening are each formed in the other wall of the housing, the last-mentioned fluid passageway being aligned with the first-mentioned fluid opening and each being aligned with one of the rotor openings in bypass positions of the control discharge valve, and the last-mentioned fluid opening being aligned with the first-mentioned fluid passageway and each being aligned with one other of the rotor openings in bypass positions of the control discharge valve; and wherein the control discharge valve is defined further to include: a plurality of plungers, one of the plungers slidingly disposed in each of the rotor openings, each plunger being slidingly biased in one direction toward one end of the rotor via the received power fluid forcing the power fluid disposed within the rotor opening between the plunger and the end of the rotor toward which the plunger is being biasingly slid via the received power fluid from the rotor opening in bypass positions of the control discharge valve.

8. The apparatus of claim 6 wherein the control discharge valve is defined further to include:

- at least one plunger, each plunger having opposite ends, one end portion slidingly disposed through a portion of one of the rotor openings near one end of the rotor and the opposite end portion extending a distance from the rotor;
- a plunger stop formed on a portion of each plunger generally between the opposite ends of each plunger, each plunger stop having a portion engaging one end portion of the rotor limiting the sliding movement of one of the plungers in a direction disposing one end portion of the plungers within the rotor openings;
- plunger bias spring means biasingly engaging the plunger stops of each of the plungers biasing the plungers in a direction disposing one end portion of the plungers within the rotor openings, the power fluid entering the rotor openings in bypass positions of the control discharge valve biasing the plungers in a direction generally opposed to the biasing force of the plunger bias spring means; and
- means controllingly adjusting the biasing force of the plunger bias spring means thereby variably controlling the measured amount of power fluid bypassed via the control discharge valve in bypass positions thereof.

9. The apparatus of claim 8 wherein the means controllingly adjusting the plunger bias spring means biasing force is defined further to include:

- a plunger guide, having a plurality of plunger openings formed therethrough, the end of each of the plungers, opposite the end thereof disposed within one of the rotor openings, being slidingly disposed through one of the plunger openings, the plunger guide being slidingly disposed within the rotor chamber spaced a distance from one end of the rotor and the plunger bias spring means engaging a portion of the plunger guide and a portion of the plunger stops, the spacing between the plunger guide and the rotor controlling the biasing force exerted via the plunger bias spring means; and
- means to slidingly vary the spacing between the plunger guide and the rotor controllingly varying the biasing force of the plunger bias spring means.

10. The apparatus of claim 6 wherein the rotor includes a plurality of rotor openings spaced circumferentially about the rotor; and wherein the rotor chamber forms a pair of opposed walls in the housing, one fluid passageway and one fluid opening formed in one of the opposed walls and another fluid passageway and another fluid opening formed in the other opposed wall, each of the fluid passageways being axially aligned with the fluid opening formed in the opposite opposed wall of the housing, one of the fluid passageways and the fluid opening axially aligned therewith each being sequentially aligned with one of the rotor openings and the other fluid passageway and the fluid opening axially aligned therewith each being sequentially aligned with the one other of the rotor openings in bypass positions of the control discharge valve; and wherein the control discharge valve is defined further to include a plurality of plungers, a pair of plungers slidingly disposed in each of the rotor openings, a plurality of rotor control fluid openings formed through the rotor, each of the rotor control fluid openings intersecting one of the rotor openings generally between the pair of plungers disposed therein; and wherein the control discharge valve housing is defined further to include: a control fluid opening formed therein intersecting a portion of the rotor chamber and fluidically communicating with each of the rotor control fluid openings, and a control fluid port formed through a portion of the housing intersecting a portion of the control fluid openings for receiving a control fluid and passing the received control fluid to each of the rotor openings via the control fluid opening in the housing and the rotor control fluid openings, the control fluid in each of the rotor openings biasing the plungers in a direction generally opposite the biasing direction of the plungers resulting from the power fluid entering the rotor openings, the pressure level of the control fluid controlling the distance of travel of each of the plungers in the rotor openings thereby controlling the measure amount of power fluid bypassed via the control discharge valve at bypass positions thereof; and means supplying the control fluid to the control discharge valve at adjustably variable pressure levels for controlling the measured amount of power fluid bypassed by the control discharge valve at bypass positions thereof.

11. The apparatus of claim 10 defined further to include:
a piston chamber having one portion connected to receive a portion of the power fluid and one portion connected to receive and pass the control fluid therethrough; and
a piston slidingly disposed within the piston chamber, and disposed therein with the power fluid on one side thereof and the control fluid on the opposite side thereof, the piston being slidingly moved within the piston chamber in response to changes in the pressure level of the power fluid and varying the pressure level of the control fluid in response thereto.

12. The apparatus of claim 4 wherein the gear means of the transmission cavity is defined further to include: a first gear rotatingly supported within a portion of the transmission cavity housing having a portion meshingly engaging a portion of the drive gear in rotated positions of the transmission cavity housing; a second gear rotatingly supported within a portion of the transmission cavity housing having a portion meshingly engaging a portion of the drive gear in rotated positions of the transmission cavity housing; and wherein the fluid passageway in the transmission cavity housing fluidically communicates with the meshingly engaged portions between each of the first and the second gears and the drive gear; and wherein the transmission cavity housing includes openings connected to the control discharge valve providing fluidic communication between the control discharge valve and the transmission cavity housing fluid passageway via the meshingly engaged portions of the first and the second gears and the drive gear.

13. A hydraulic transmission system, comprising:
a transmission system output shaft;
a power fluid reservoir retaining a predetermined amount of power fluid;
a transmission cavity, comprising:
a housing having a fluid passageway formed in a portion thereof, the fluid passageway connected to the power fluid reservoir and receiving power fluid therefrom;
a drive gear connected to the transmission system output shaft rotatingly driving the transmission system output shaft in a driven position of the drive gear; and
gear means rotatingly supported in a portion of the housing of the transmission cavity, having a portion meshingly engaging portions of the drive gear imparting rotational force thereto, in one position;
means connected to the housing of the transmission cavity rotating the housing thereby rotating the gear means about the drive gear; and
means connected to the housing of the transmission cavity fluidically communicating with the fluid passageway via the meshingly engaged portions of the gear means and the drive gear receiving power fluid therethrough and controlling the amount of power fluid received therethrough thereby controlling the speed and torque applied at the transmission system output shaft.

14. The apparatus of claim 13 wherein the gear means of the transmission cavity is defined further to include: a first gear rotatingly supported within a portion of the transmission cavity housing having a portion meshingly engaging a portion of the drive gear in rotated positions of the transmission cavity housing; a second gear rotatingly supported within a portion of the transmission cavity housing having a portion meshingly engaging a portion of the drive gear in rotated positions of the transmission cavity housing; and wherein the fluid passageway in the transmission cavity housing fluidically communicates with the meshingly engaged portions between each of the first and the second gears and the drive gear; and wherein the transmission cavity housing includes openings connected to the means controlling the flow of power fluid through the transmission cavity housing and providing fluidic communication therewith with the fluid passageway of the transmission cavity housing via the meshingly engaged portions of the first and the second gears and the drive gear.

* * * * *

PO-1050
(5/69)

UNITED STATES PATENT OFFICE
CERTIFICATE OF CORRECTION

Patent No. 3,838,574          Dated October 1, 1974

Inventor(s) Albert H. Gelders

It is certified that error appears in the above-identified patent and that said Letters Patent are hereby corrected as shown below:

Column 4, line 34, "section" should be -sections-.

Column 6, line 14, "thelength" should be -the length-.

Column 18, line 23, "in" should be -is-.

Column 18, line 65, "220" should be -230-.

Column 30, line 44 "sahft" should be -shaft-.

Column 33, line 29, "openings" should be -opening-.

Signed and sealed this 17th day of December 1974.

SEAL)
Attest:

McCOY M. GIBSON JR.          C. MARSHALL DANN
Attesting Officer          Commissioner of Patents